US012645369B2

(12) United States Patent
Ki et al.

(10) Patent No.: US 12,645,369 B2
(45) Date of Patent: *Jun. 2, 2026

(54) PERSISTENT MEMORY WITH CACHE COHERENT INTERCONNECT INTERFACE

(71) Applicant: Samsung Electronics Co., Ltd., Suwon-si (KR)

(72) Inventors: Yang Seok Ki, Palo Alto, CA (US); Chanik Park, San Jose, CA (US); Sungwook Ryu, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,925

(22) Filed: Apr. 8, 2024

(65) Prior Publication Data

US 2024/0345742 A1 Oct. 17, 2024

Related U.S. Application Data

(63) Continuation of application No. 17/858,058, filed on Jul. 5, 2022, now Pat. No. 11,966,590.
(Continued)

(51) Int. Cl.
*G06F 3/06* (2006.01)
*G06F 12/0804* (2016.01)
*G06F 12/0811* (2016.01)

(52) U.S. Cl.
CPC .......... *G06F 3/0619* (2013.01); *G06F 3/0647* (2013.01); *G06F 3/0685* (2013.01); *G06F 12/0804* (2013.01); *G06F 12/0811* (2013.01)

(58) Field of Classification Search
CPC .... G06F 3/0619; G06F 3/0647; G06F 3/0685; G06F 12/0804; G06F 12/0811;
(Continued)

(56) References Cited

U.S. PATENT DOCUMENTS

| | | | |
|---|---|---|---|
| 8,688,899 B2 | 4/2014 | Nellans et al. | |
| 9,086,973 B2 | 7/2015 | Vorbach | |

(Continued)

FOREIGN PATENT DOCUMENTS

| | | |
|---|---|---|
| CN | 114020655 A | 2/2022 |
| WO | 2021177868 A1 | 9/2021 |

OTHER PUBLICATIONS

European Extended Search Report for Application No. 23158248.7, mailed Jul. 7, 2023.
(Continued)

*Primary Examiner* — Hiep T Nguyen
(74) *Attorney, Agent, or Firm* — Renaissance IP Law Group LLP

(57) ABSTRACT

A persistent memory device is disclosed. The persistent memory device may include a cache coherent interconnect interface. The persistent memory device may include a volatile storage and a non-volatile storage. The volatile storage may include at least a first area and a second area. A backup power source may be configured to provide backup power selectively to the second area of the volatile storage. A controller may control the volatile storage and the non-volatile storage. The persistent memory device may use the backup power source while transferring a data from the second area of the volatile storage to the non-volatile storage based at least in part on a loss of a primary power for the persistent memory device.

20 Claims, 12 Drawing Sheets

Related U.S. Application Data

(60) Provisional application No. 63/340,437, filed on May 10, 2022, provisional application No. 63/314,361, filed on Feb. 25, 2022.

(58) Field of Classification Search
CPC ........ G06F 12/0815; G06F 1/263; G06F 1/12; G06F 1/30; G06F 11/2015; G06F 11/1441; G06F 13/4221; G06F 2212/214; G06F 2213/006
See application file for complete search history.

(56) References Cited

U.S. PATENT DOCUMENTS

| | | | |
|---|---|---|---|
| 9,223,709 | B1 | 12/2015 | O'Bleness et al. |
| 9,383,932 | B2 | 7/2016 | Sharma et al. |
| 9,432,298 | B1 | 8/2016 | Smith |
| 10,346,091 | B2 | 7/2019 | Bernat et al. |
| 10,402,326 | B1 | 9/2019 | Hall et al. |
| 10,838,865 | B2 | 11/2020 | Leidel et al. |
| 11,175,853 | B2 | 11/2021 | Chang et al. |
| 11,966,590 | B2 * | 4/2024 | Ki ........................... G06F 1/263 |
| 2011/0258393 | A1 | 10/2011 | Flower et al. |
| 2013/0111109 | A1 | 5/2013 | Sartore |
| 2015/0006834 | A1 * | 1/2015 | Dulloor ................. G06F 3/0659 711/162 |
| 2015/0012699 | A1 | 1/2015 | Rizzo et al. |
| 2015/0178202 | A1 * | 6/2015 | Sankaran ............ G06F 12/0804 711/143 |
| 2018/0107596 | A1 | 4/2018 | Kelly et al. |
| 2019/0004960 | A1 | 1/2019 | Wang et al. |
| 2019/0235599 | A1 * | 8/2019 | Yuasa ................... G06F 3/0634 |
| 2020/0192715 | A1 | 6/2020 | Wang et al. |
| 2020/0264980 | A1 | 8/2020 | Wang et al. |
| 2020/0327084 | A1 | 10/2020 | Choudhary et al. |
| 2021/0042228 | A1 | 2/2021 | Herdrich et al. |
| 2021/0149680 | A1 | 5/2021 | Hughes et al. |
| 2021/0311646 | A1 | 10/2021 | Malladi et al. |
| 2021/0373951 | A1 | 12/2021 | Malladi et al. |
| 2021/0374080 | A1 | 12/2021 | Horwich et al. |
| 2022/0043753 | A1 | 2/2022 | Cohen et al. |
| 2023/0185755 | A1 | 6/2023 | Jain et al. |

OTHER PUBLICATIONS

Notice of Allowance for U.S. Appl. No. 17/858,058, mailed Dec. 21, 2023.

Office Action for U.S. Appl. No. 17/858,058, mailed Jun. 23, 2023.

Shantharama, Prateek et al., "Hardware-Accelerated Platforms and Infrastructures for Network Functions: a Survey of Enabling Technologies and Research Studies," IEEE Access 8, Jul. 2020, pp. 132021-132085.

* cited by examiner

710

Start

810

805

Delete a data at the address in the first area of the DRAM

825

Allocate an address in the second area of the DRAM for the data

815

Allocate an address in the first area of the DRAM for the data

830

Load the data from the SSD into the second area of the DRAM

820

Load the data from the SSD into the first area of the DRAM

End

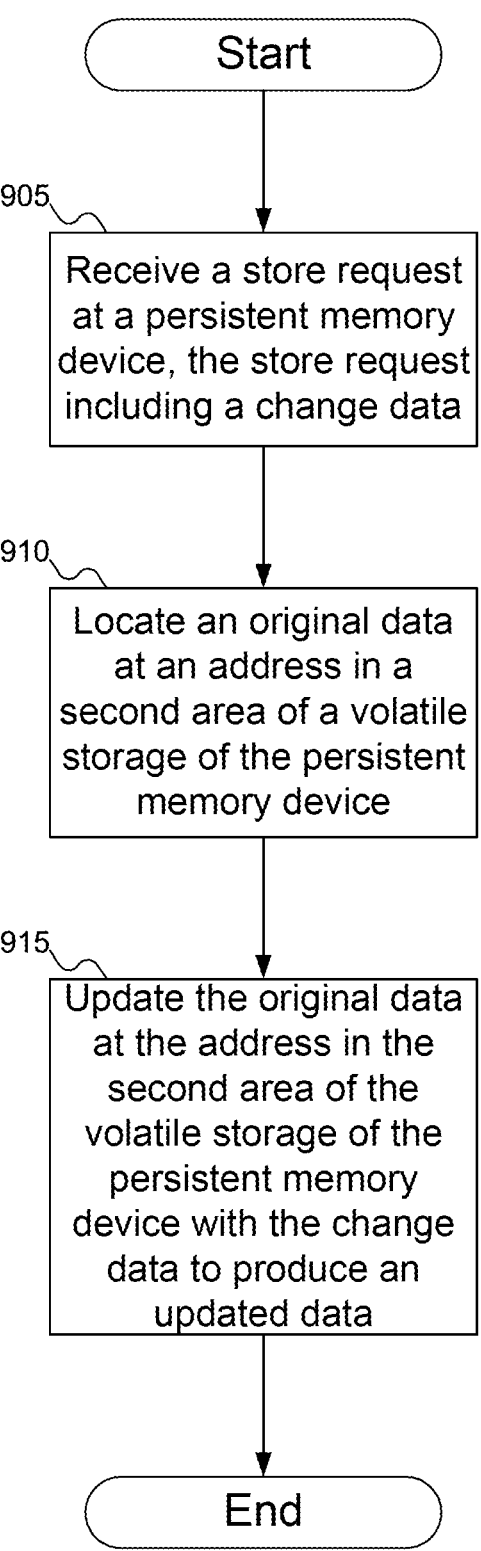

Start

905 Receive a store request at a persistent memory device, the store request including a change data 910 Locate an original data at an address in a second area of a volatile storage of the persistent memory device 915 Update the original data at the address in the second area of the volatile storage of the persistent memory device with the change data to produce an updated data End

FIG. 9

PERSISTENT MEMORY WITH CACHE COHERENT INTERCONNECT INTERFACE

RELATED APPLICATION DATA

This application is a continuation of U.S. patent application Ser. No. 17/858,058, filed Jul. 5, 2022, now allowed, which claims the benefit of U.S. Provisional Patent Application Ser. No. 63/340,437, filed May 10, 2022, and U.S. Provisional Patent Application Ser. No. 63/314,361, filed Feb. 25, 2022, all of which are incorporated by reference herein for all purposes.

FIELD

The disclosure relates generally to storage, and more particularly to a memory storage device with persistent storage to back up the memory.

BACKGROUND

Because memory may be faster than other forms of storage, memory may be used to cache data in a storage system. But memory also may be volatile storage, meaning that if the power is interrupted and data stored in the memory may be lost. In systems where data loss is not acceptable, using memory as a cache may be unacceptable.

A need remains for a way to improve the use of memory in a multi-level cache.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 9 shows a flowchart of an example procedure for processing a store request using the persistent memory device of FIG. 1, according to embodiments of the disclosure.

SUMMARY

Figure 1:
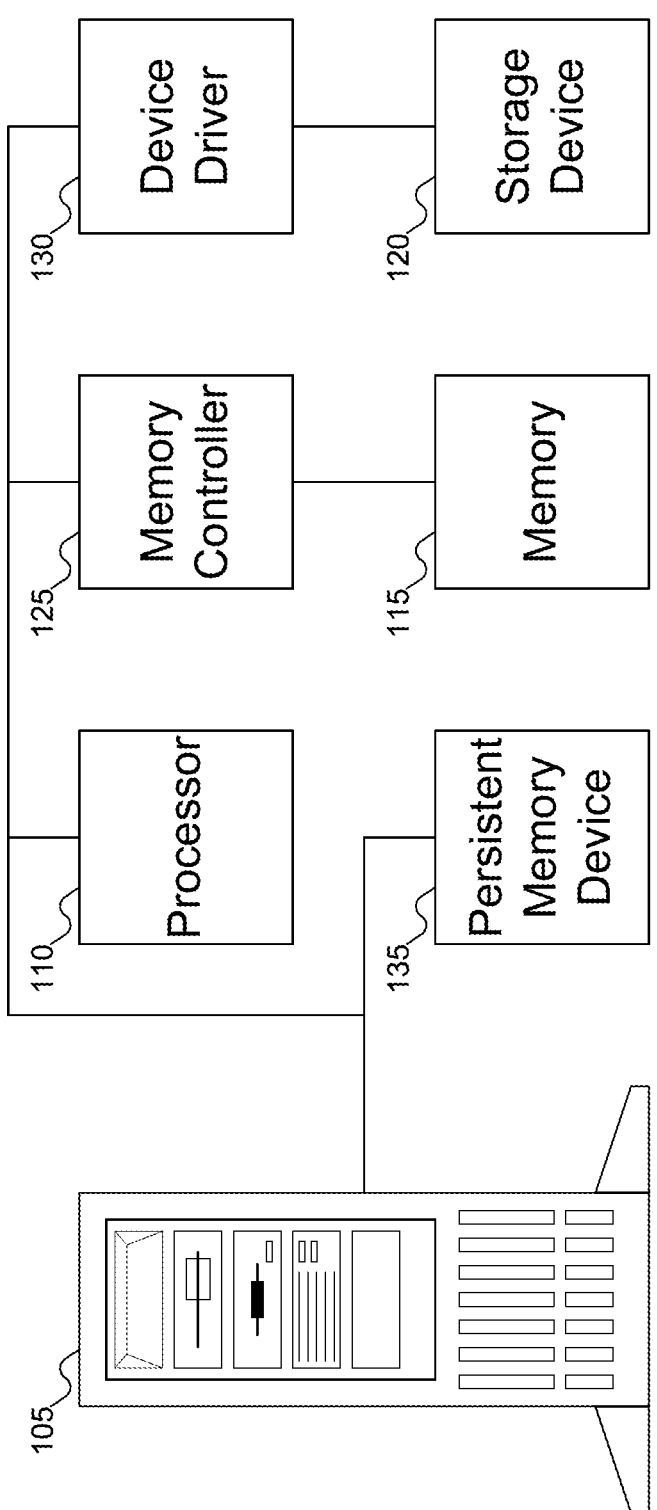
FIG. 1 shows a machine including a persistent memory device, according to embodiments of the disclosure.

Embodiments of the disclosure include a storage system. The storage system may include two or more storage devices. A receiver may receive an encoded stream. A splitter may identify chunks in the encoded stream. A distributor may store the chunks on the storage devices.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Memory may be used as one level of a multi-level cache for data. Memory may be faster to access than other layers of the multi-level cache, and therefore may return data in response to requests more rapidly than other layers of the multi-level cache.

But memory also may be more expensive than storage used for other levels of the multi-level cache. Put another way, the cost for per unit of storage for memory may be higher than the cost per unit of storage for other forms of storage. Implementing a cache using just memory might be cost-prohibitive in systems that may use large caches.

Memory may also be implemented using volatile storage. Volatile storage may lose any stored data if the power should be interrupted. In systems that expect no data to be lost, using volatile storage may be considered an unacceptable risk.

Embodiments of the disclosure may address these problems by dividing memory into multiple different areas, some of which may be protected against power loss by a battery, capacitor, or other available power source that may operate in case main power is interrupted. Using the battery or capacitor, any updates to data that are stored in the memory may be migrated to non-volatile storage (such as flash memory, flash storage, or a disk). Once all updates to data that are stored in the memory have been migrated to non-volatile storage, use of the battery or capacitor may be ended: any data that may be lost as a result of the power interruption may no longer be a concern.

FIG. 1 shows a machine including a persistent memory device, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may each support any desired protocol or protocols, including, for example, the Non-Volatile Memory Express (NVMe) protocol. Different storage devices 120 may support different protocols and/or interfaces.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, one storage device 120 might be a hard disk drive, and another storage device 120 might be an SSD.

In some embodiments of the disclosure, machine 105 may be storage server. Machine 105 may therefore store data to be used by other servers, such as a database server (not shown in FIG. 1). In such embodiments of the disclosure, data may be read from machine 105 to be sent to another server, or written to machine 105 from another server.

In some embodiments of the disclosure—for example, where machine 105 stores databases—machine 105 may be processing load and store request that involve large amounts of data. It is desirable that machine 105 be able to spend as much time as possible processing requests coming from other machines, and therefore to minimize the amount of work done internally to support operations.

Caches may be used to try and improve the performance of machine 105. For example, typically the fastest forms of storage, such as processor caches and/or Random Access Memory (RAM), tend to be more expensive to manufacture and purchase, and tend to have smaller capacities, than slower forms of storage, such as SSDs and hard disk drives. But with appropriate management of what data is stored in the smaller forms of storage, faster processing of requests may be possible. For example, returning data stored in RAM may be faster than returning data from an SSD, and writing data to RAM may be faster than writing data to an SSD.

But there are potential downsides to using different forms of storage as layers in a cache, particularly forms of storage that are not persistent. For example, consider the situation where a store request results in data being stored in RAM. If power should be interrupted, then the data stored in RAM (a volatile storage) may be lost. Thus, when data needs to be persistent, even if the data is stored initially in volatile storage, the data may need to be copied out to non-volatile storage to ensure the data is not lost if power is interrupted.

Persistent memory device 135 may act as a faster layer of storage, roughly equivalent in performance to memory 115 (and possibly faster than storage device 120: that is, a lower latency). In addition, persistent memory device 135 may include a mechanism to protect against data loss in the event of a power interruption.

Figure 2:
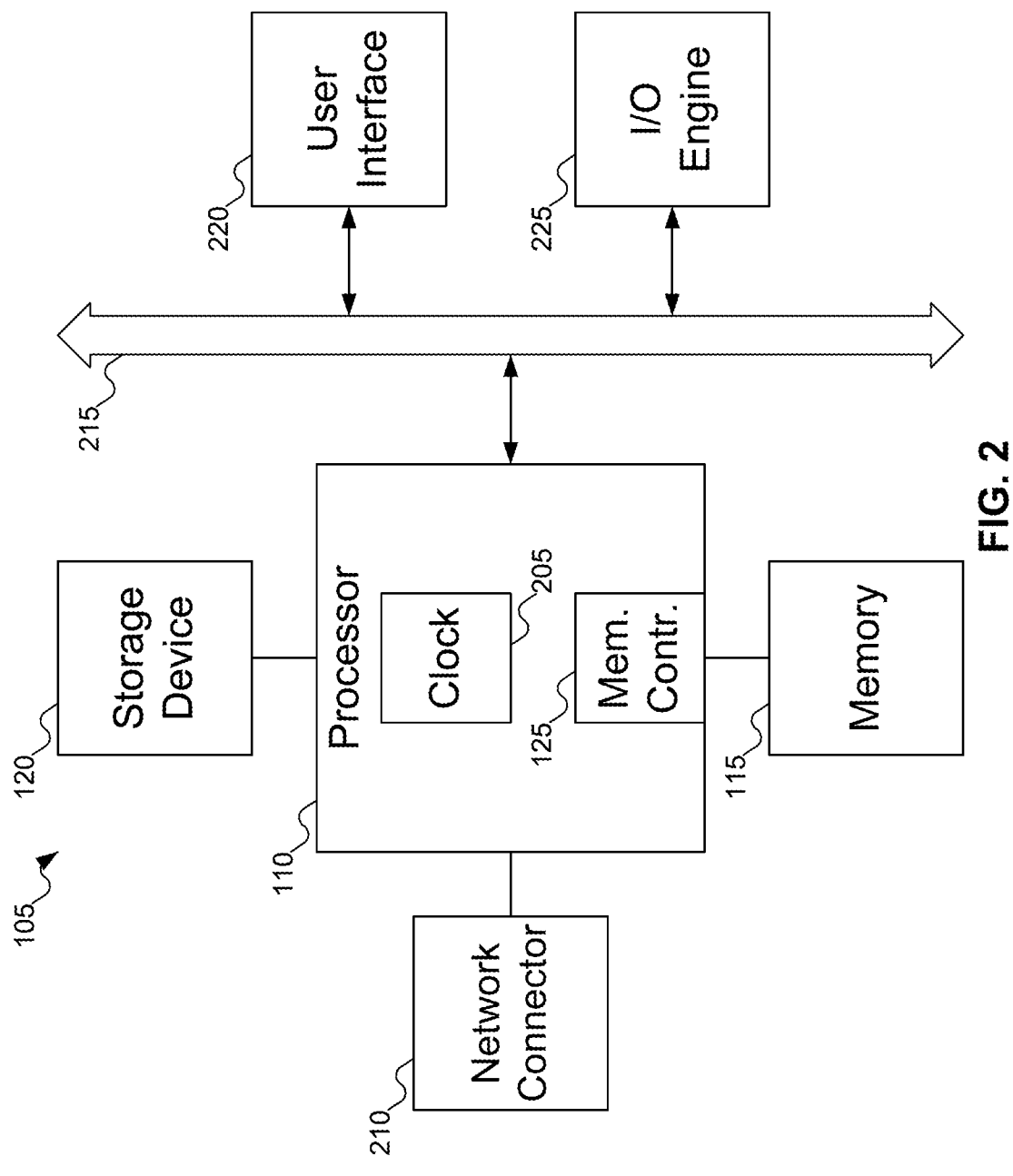
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
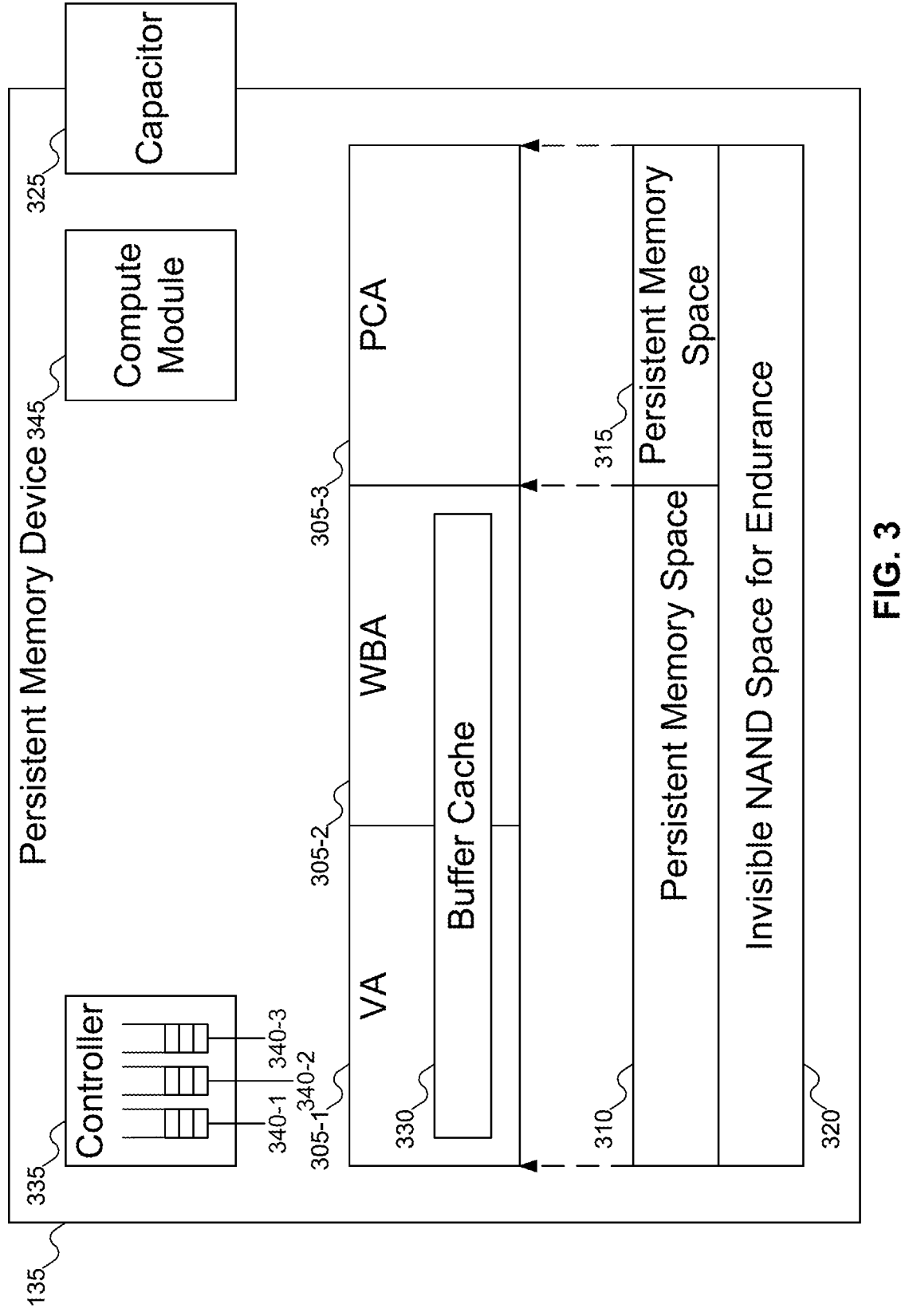
FIG. 3 shows details of the persistent memory device of FIG. 1, according to embodiments of the disclosure.

FIG. 3 shows details of persistent memory device 135 of FIG. 1, according to embodiments of the disclosure. In FIG. 3, persistent memory device 135 may include a volatile storage, which is divided into multiple areas. In FIG. 3, the volatile memory is shown divided into three areas 305-1, 305-2, and 305-3, which may also be referred to collectively as areas 305. In FIG. 3, area 305-1 may be labeled the volatile area (VA), area 305-2 may be labeled the write back area (WBA), and area 305-3 may be labeled the pinned cache area (PCA). Area 305-1 may be volatile storage that is unpinned, area 305-2 may be volatile storage that is backed by a backup power source in case of power interruption (and thus at least partially persistent storage) and that is unpinned, and area 305-3 may be volatile storage that is backed by a backup power source and is pinned (that is, the data in area 305-3 may not be evicted from area 305-3).

The volatile storage may be backed, in whole or in part, by underlying non-volatile storage. The underlying non-volatile storage may include, for example, one or more SSDs. Persistent memory spaces 310 and 315 may represent exposed available storage in the underlying non-volatile storage, with space 320 acting as additional available space that may be used for endurance (for example, as additional storage so that wear may be distributed across more storage space, thereby avoiding the need for earlier replacement of the non-volatile storage). Thus, capacity of persistent memory spaces 310 and 315 may be less than the total available storage of the underlying non-volatile storage. Note that while persistent memory spaces 310 and 315 are shown as separate, in some embodiments of the disclosure persistent memory spaces 310 and 315 may considered one large persistent memory space, rather than being divided into different portions supporting persistent storage of data in different areas 305 of the volatile storage.

In addition, while FIG. 3 suggests that a single non-volatile storage is used to provide persistent storage of data, embodiments of the disclosure may include two or more level of non-volatile storage, as in a cache hierarchy. For example, one may use hard disk drives (large capacity with high latency), and another level may use flash memory (medium capacity, with medium latency). With DRAM (smaller capacity with low latency) acting as the volatile storage. The flash memory may act as the primary non-volatile storage for data in the volatile storage, with the hard disk drives acting as a secondary non-volatile storage.

Area 305-1 may be used to store data that is clean: that is, the data in area 305-1 may be as read from the underlying non-volatile storage. Since the data in area 305-1 may be unchanged from the data in the underlying non-volatile storage, there is no concern about data loss due to a power interruption for data in area 305-1. If power is interrupted, the data in area 305-1 may be lost from the volatile storage, but the data is still available from the underlying non-volatile storage. So if the data is needed after power is restored, the data may be read from the underlying non-volatile storage, and no data may be lost.

Area 305-1 may function as a cache, with data being loaded as needed into area 305-1. Should area 305-1 be full—that is, area 305-1 does not have a free cache line into which data may be loaded—an existing cache line in area 305-1 may be evicted (the data in the selected cache line may be deleted) to make room for the new data. Any policy may be used to select the cache line to be evicted: for example, the least recently used cache line may be selected for eviction, or the least frequently used cache line may be selected for eviction, among other possibilities.

Area 305-2 may be used to store data that is dirty: that is, the data in area 305-2 may have been changed relative to the data stored in the non-volatile storage. For example, a database server that requested data from machine 105 of FIG. 1 may change or update the data, then write the updated data back. Until the data is written back to the non-volatile storage, the data may be stored in area 305-2.

Because the data in area 305-2 may be updated relative to the data stored in the non-volatile storage, if power were to be interrupted or lost, the data stored in area 305-2 could be lost as well. Such data—data that has been changed but not yet written to the non-volatile storage, may be called dirty data. To protect against this possibility, persistent memory device 135 may include backup power source 325. While FIG. 3 shows backup power source 325 as a capacitor, backup power source 325 may take any desired form: for example, a battery. Backup power source 325 may provide sufficient power such that, in case of a power loss or power interruption, the data stored in area 305-2 may be maintained until it is written to the non-volatile storage. Once the dirty data has been written to the non-volatile storage, there is no concern about data loss due to the power interruption, and persistent memory device 135 may then operate as normal when power is interrupted.

Because area 305-2 may store dirty data, persistent memory device 135 may eventually transfer the dirty data to the non-volatile storage. But at the same time, persistent memory device 135 may want to avoid interfering with the performance of the non-volatile storage: other operations that the other server has requested be performed should be performed as efficiently as possible. To balance these concerns, persistent memory device 135 may transfer data from area 305-2 into the non-volatile storage using any desired approach. For example, persistent memory device 135 may monitor how many dirty data blocks are in area 305-2. When the number grows too large, a checkpoint may be triggered to cause some (or all) dirty memory blocks to be flushed from area 305-2 into the non-volatile storage. Or persistent memory device 135 may track its overall usage, and particularly the utilization of the non-volatile storage. If the utilization of the non-volatile storage drops, there may be an opportunity to write dirty data from area 305-2 into the non-volatile storage, thereby avoiding the need to perform such a write when persistent memory device 135 us being more actively utilized. Such an approach may be termed an opportunistic writeback.

In the event of a power interruption, backup power source 325 may be used to transfer any data from area 305-2 to the non-volatile storage. Since the data in area 305-2 may be data written by the database server but not yet committed to the non-volatile storage, in the event of a power interruption the data in area 305-2 may be written to the target addresses in the non-volatile storage, completing the write requests issued by the database server. In other words, since the data in area 305-2 may be committed to the non-volatile storage to prevent data loss due to the power interruption, the data may be committed to the location where the data would have been stored when eventually written in the normal course of events (for example, due to a checkpoint or a convenient drop in non-volatile storage utilization).

Note that persistent memory device 135 is shown as including buffer cache 330, which may span both areas 305-1 and 305-2. Area 305-1 may be thought of as a buffer cache for clean data, and area 305-2 may be thought of as a buffer cache for dirty data. But some embodiments of the disclosure may use buffer cache 330 in other ways. For example, if area 305-1 is full but area 305-2 has a free cache line, rather than evicting a cache line from area 305-1 to make room for new data to be loaded, a free cache line in area 305-2 may be selected instead and the data loaded into area 305-2. Thus, even though area 305-2 may be thought of as being for dirty data, area 305-2 may also be used to load clean data. (On the other hand, since area 305-1 may not be backed by backup power source 325, using area 305-1 to store dirty data might result in data loss, which should be avoided.)

Finally, area 305-3 may be used to store redo log data. That is, when a server, such as a database server, makes changes to data stored on machine 105 of FIG. 1, the particular changes themselves (as compared with the changed data) may be stored in persistent memory device 135 as a redo log. Then, if the database server is unable to send a request to write the changed data back to the non-volatile storage, the redo log may be used to recreate the changes. While the term "redo log" is used to describe the changes being made by the database server, embodiments of the disclosure may store any form of data, including a record of individual data changes, in area 305-3. In the discussion below, the term "redo log" may be replaced with any other term, such as any transient dirty data, without any loss of applicability.

Because redo logs may be stored only long enough to ensure that the actual changed data itself is written, redo logs may be thought of as temporary files: they may be deleted once the changes are actually written to machine 105 of FIG. 1. That is, redo logs may be persistent only until the data is actually written by the database server back to machine 105 of FIG. 1: once the data has been written to machine 105 of FIG. 1, the redo logs may be deleted. The redo logs may therefore be thought of as transient: they may be stored only to guard against the possibility of the actual data not being successfully written for some reason, and may be deleted once the data has been successfully written to machine 105 of FIG. 1. Thus, storing redo logs on the non-volatile storage might result in significant use of the non-volatile storage: the data might be written, and then shortly thereafter deleted. These frequent commands being processed by the non-volatile storage may affect other commands from being processed efficiently: for example, commands to read data from the non-volatile storage. To avoid this situation, area 305-3, as mentioned above, may be a pinned area, keeping the data in area 305-3 until it is deleted, at which time the data may be deleted from area 305-3 without having to delete data from the non-volatile storage.

One question that may arise is what to do if area 305-3 is full (there are no free cache lines) but the database server attempts to write a new redo log to area 305-3. Rather than evicting a redo log from area 305-3 (and writing it to the non-volatile storage), persistent memory device 135 to reject the request to write the data to area 305-3. At that point, the database server may write data into area 305-2 to update actual stored data, and once that store request is complete, the corresponding redo logs in area 305-3 may be deleted freeing up one or more cache lines for new redo logs.

Because the redo logs in area 305-3 are important-they provide a basis for reconstructing changes that have not yet been written to the non-volatile storage-area 305-3 may be backed by backup power source 325. Then, if persistent memory device 135 experiences a power loss or power interruption, the data stored in area 305-3 may be written to the non-volatile storage device. In this manner, the data in area 305-3 may be recovered in case of a power interruption, and the ability to reconstruct the changes to the data may be preserved.

While the above discussion regarding area 305-3 focuses on redo logs, other data may also be stored in area 305-3. For example, if the database server has some temporary files that should be stored in persistent memory device 135, those temporary files may be stored in area 305-3.

In the above discussion, the term "cache line" is used. The term "cache line" may be understood to refer to a portion of the volatile storage in areas 305 whose size is known. Typically, the size of a cache line is known in advance, and the size may be leveraged with reference to how data is loaded and stored, both in areas 305 and in other areas. Other terms, such as "address" or "block", may be used in place of "cache line" without any loss of meaning. Depending on the form the volatile storage takes, one term or another may be considered the typical term. But for purposes of this description, within the volatile storage these various terms are all considered interchangeable, and to refer to some understood portion of the volatile storage.

In the above discussion, three types of volatile storage areas have been described-unpinned cache without battery backup (area 305-1), unpinned cache with battery backup (area 305-2), and pinned cache with battery backup (area 305-3). Embodiments of the disclosure may include some or all of these areas. For example, redo logs may be written to area 305-2 and area 305-3 may be omitted (but at the cost of potentially more data being written to and deleted from the non-volatile storage with its impact on non-volatile storage efficiency). Or persistent memory device may include a fourth area, which may be used to store pinned data that is not backed by backup power source 325. Such an area might be used, for example, to store metadata for data in area 305-1. Such metadata (which may come, for example, from the database server) may be sufficiently important that persistent memory device 135 might want to keep such data in the volatile storage. But because the data is persistently stored already (for example, at the database server) persistent memory device 135 may not need to keep the metadata in an area that is backed by backup power source 325: no data would be lost if power were interrupted.

As discussed above, backup power source 325 may provide power for backup power for data stored in area 305-2 and 305-3, but not for data stored in area 305-1. That backup power source 325 provides power for some, but not all, of areas 305 may be interpreted as backup power source 325 providing power selectively to areas 305: some areas 305 may be selected for backup power, and other areas 305 may not be selected for backup power.

As discussed above, in the event of a power interruption, backup power source 325 may be used to store data to the non-volatile storage. But what about when power is restored (that is, when the system is restarted or rebooted)? As noted above, data in area 305-1 is already stored in the non-volatile storage. While the data that had been in area 305-1 prior to the power interruption could be reloaded into area 305-1, embodiments of the disclosure may include not restoring data to area 305-1 after power is restored. Area 305-1 may act as a cache: when data is requested, that data may be loaded into area 305-1.

Since the data in area 305-2 could be reloaded, as discussed above area 305-2 may be used to store data to be written to the non-volatile storage. As such, if a power interruption occurs the data may be committed to the non-volatile storage in their intended locations. Therefore, like the data in area 305-1, embodiments of the disclosure may include not restoring the data that was in area 305-2 after power is restored.

The data in area 305-3, on the other hand, may include redo logs or other transient information about changes being made to the data but that have not yet been copied into area 305-2 by the database server. If such redo logs in area 305-3 were not committed to the non-volatile storage and the changed data were lost by the database server, there might be no way to recover the changed data.

Even worse, the data on machine 105 of FIG. 1 might be left in an unstable state, meaning that there might effectively be errors by implication in other data on machine 105 of FIG. 1. For example, consider the situation where the database server stores data on machine 105 of FIG. 1 using some form of encryption applied by the database server. If this encryption covers data stored in two different blocks, it might not be possible to decrypt the data in one block without reading the encrypted data from the other block as well. But if persistent memory device 135 receives only one of the two blocks of data before the power interruption occurs, unless there is some way to recover or recreate the second block of data, the first block of data might not be readable even though it had been successfully written to machine 105.

Thus, after a power interruption, persistent memory device 135 may load the data that had been in area 305-3 back into area 305-3 from the non-volatile storage when power is restored. By restoring the data to area 305-3, persistent memory device 135 may enable recreation of data blocks that, for whatever reason, were not written to the non-volatile storage when power was interrupted.

Persistent memory device 135 may be configurable. That is, the size of areas 305 may be configurable by a user. For example, a user may use various commands to set the sizes of areas 305. The commands to configure the sizes of area 305 may specify which device is to be used as persistent memory device 135, the area 305 to be configured, the size of the area, an offset into the memory for the area 305, and/or how much persistent memory (non-volatile storage) is to be used allocated for the area 305. In some embodiments of the disclosure, the sizes and the offsets to be used in configuring persistent memory device 135 may be measured in units larger than one byte: for example, the size of the areas 305 may be configured in units of 4 KB each, and offsets for the areas 305 may be configured in units of 1 MB each.

In some embodiments of the disclosure, persistent memory device 135 may be use a cache coherent interconnect protocol, such as the Compute Express Link (CXL) protocol. Cache coherent interconnect protocols such as CXL may offer different types of commands to access persistent memory device 135. For example, CXL offers the CXL.IO and the CXL.MEMORY protocols, which may offer different ways to access persistent memory device 135. CXL.IO protocol may function similar to the Peripheral Component Interconnect Express (PCIe) standard (which may be used to access storage devices such as storage device 120 of FIG. 1), whereas the CXL.MEMORY protocol may be used to access storage devices such as memory 115 of FIG. 1.

There may be limits on how large areas 305 may be configured to be. For example, backup power source 325 might provide enough power to retain data in the voluntary storage (such as areas 305-2 and 305-3) only for a limited amount of time. If areas 305-2 and 305-3 together are larger than some threshold that may depend on the amount of power backup power source 325 may provide, it might not be possible to retain the data in the voluntary storage long enough to write all the data to the non-volatile storage. Thus, the sizes of areas 305-2 and 305-3 may depend on the power capacity of backup power source 325. The maximum sizes of the area may therefore be smaller than the user configuration of the sizes of the areas.

Persistent memory device 135 may advertise a certain overall capacity. If persistent memory device 135 advertises a particular overall capacity, then the sum of the capacities of areas 305 may be understood to be no larger than this overall capacity. In such embodiments of the disclosure, one of areas 305—for example, area 305-1—may be understood to include all capacity not allocated to the other areas 305 as configured. (Using area 305-1 for this excess capacity has the advantage that area 305-1 is not backed by backup power source 325, and therefore may be as large as desired without concern for the power capacity of backup power source 325.) For example, if persistent memory device advertises a total of 64 GB of storage, area 305-2 is configured to have a capacity of 27 GB, and area 305-3 is configured to have a capacity of 5 GB, then area 305-1 may, by default, have a capacity of 32 GB (32 GB=64 GB−(27 GB+5 GB)).

As shown in FIG. 3, persistent memory module 135 may include controller 335. Controller 335 may be used to control access to areas 305 and to process requests involving data in those areas. For example, controller 335 may receive a load request, load the requested data into area 305-1 (if it is not already there), then read the data from area 305-1 and return the requested data to the database server. Controller 335 may also receive a store request for data to be written to persistent memory device 135, store the data in area 305-2, and return a result to the database server. Controller 335 may then trigger writeback of the data to the non-volatile storage when appropriate, such as when a checkpoint is triggered or when an opportunity opens up to write data to the non-volatile storage. (Controller 335 may also process delete requests in a similar way, although delete requests might not involve storing data in area 305-2.) Finally, controller 335 may receive a store request for a redo log to be written to persistent memory device 135, store the redo log in area 305-3, and return a result to the database server. (As discussed above, data in area 305-3, which backed by backup power source 325, is not generally written to the non-volatile storage since the data is expected to be deleted soon).

Controller 335 is shown as including queues 340-1 through 340-3 (which may be referred to collectively as queues 340). By supporting multiple queues 340, controller 335 may enable managing different types of requests in different ways, to prioritize some requests over others. Multiple queues 340 may also enable controller 335 to support processing requests from multiple different request sources, which may enable controller 335 to offer Quality of Service (QoS) guarantees to applications requesting data on machine 105 of FIG. 1.

Persistent memory device 135 may also include compute module 345. Compute module 345 may be, for example, an accelerator that may perform specialized processing of data that may be in areas 305 of the volatile storage and/or the non-volatile storage. Compute module 345 may be implemented as any desired of accelerator, including, for example, a single core processor or a multi-core processor, a graphics processing unit (GPU), a general purpose GPU (GPGPU), a System-on-a-Chip (SoC), a neural processing unit (NPU), a tensor processing unit (TPU), a field programmable gate array (FPGA), or an application-specific integrated circuit (ASIC), among other possibilities.

Figure 4:
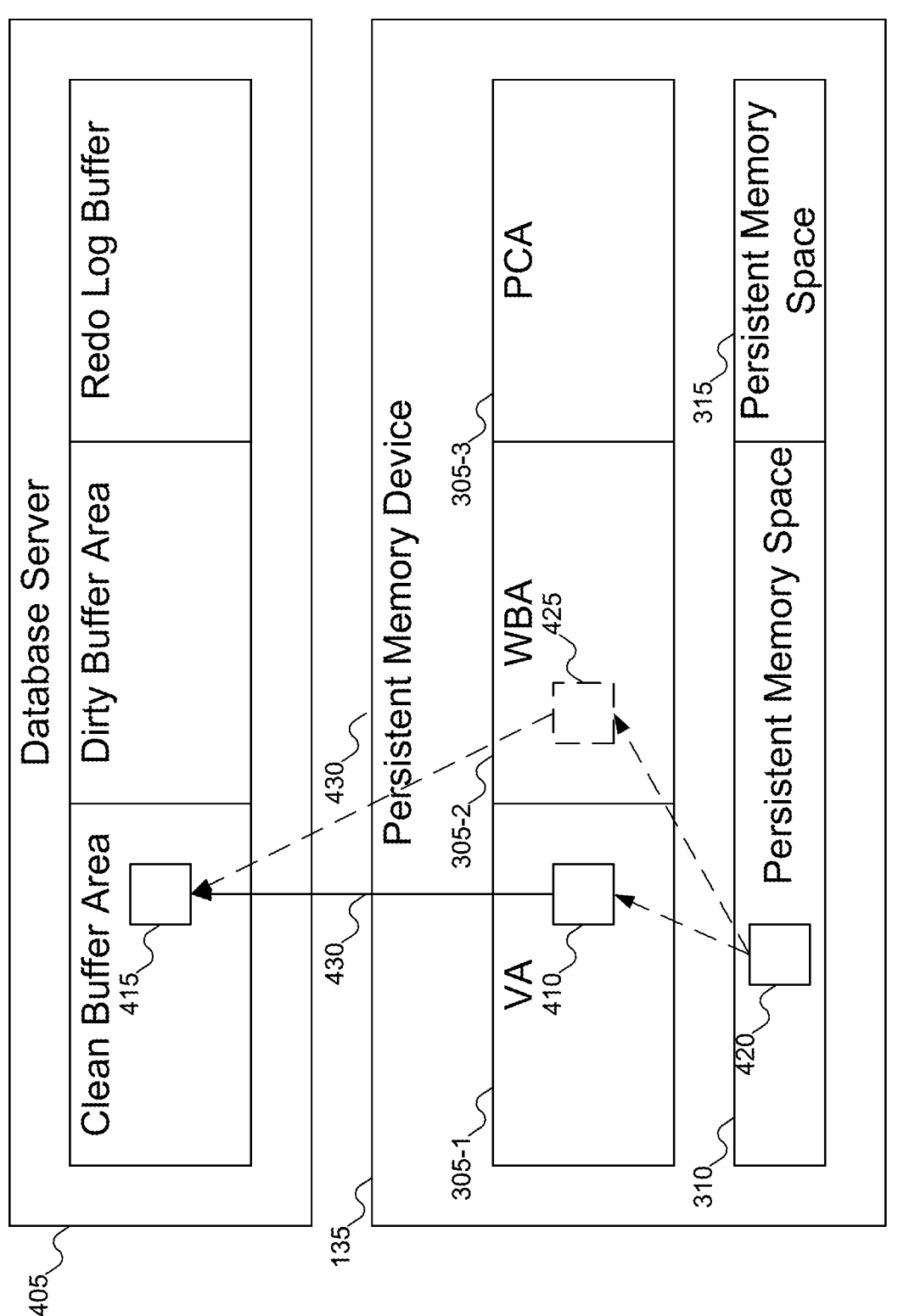
FIG. 4 shows the persistent memory device of FIG. 1 loading data, according to embodiments of the disclosure.

FIG. 4 shows persistent memory device 135 of FIG. 1 loading data, according to embodiments of the disclosure. In FIG. 4, database server 405 may send a request to read data. Controller 335 of FIG. 3 may receive this request and may determine if the data is currently in area 305-1 (shown as data 410 in FIG. 4). If data 410 is in area 305-1, then controller 335 of FIG. 3 may send data 410 of FIG. 4 to database server 405, where the data may be stored as data

415. In some embodiments of the disclosure, data 415 may be stored in a clean buffer area to indicate that the data itself is currently clean (that is, unchanged).

If data 410 is not currently in area 305-1, then data 420 may be read from the non-volatile storage, such as persistent memory space 350. A cache line in area 305-1 may be allocated. Data 420 may then be stored in the allocated cache line in area 305-1, after which controller 335 of FIG. 3 may send data 410 to database server 405.

As mentioned above, in some situations area 305-1 may not have a free cache line. In that case, there are several possible approaches. One approach is to select an address in area 305-1 and delete the data therein, which may free up a cache line to store data 410. As mentioned above, any desired approach may be used to select which cache line (address) to delete in area 305-1.

Another approach is to select a cache line in area 305-2 and use that address to store the data (shown as data 425), or to copy a cache line from area 305-1 into area 305-2 (and then use that freed cache line in area 305-1 to store the new data). As mentioned above, area 305-2 may be used as an extension of area 305-1 even though the data to be stored in area 305-2 may be clean. Controller 335 of FIG. 3 may then send data 425 to database server 405.

Figure 5:
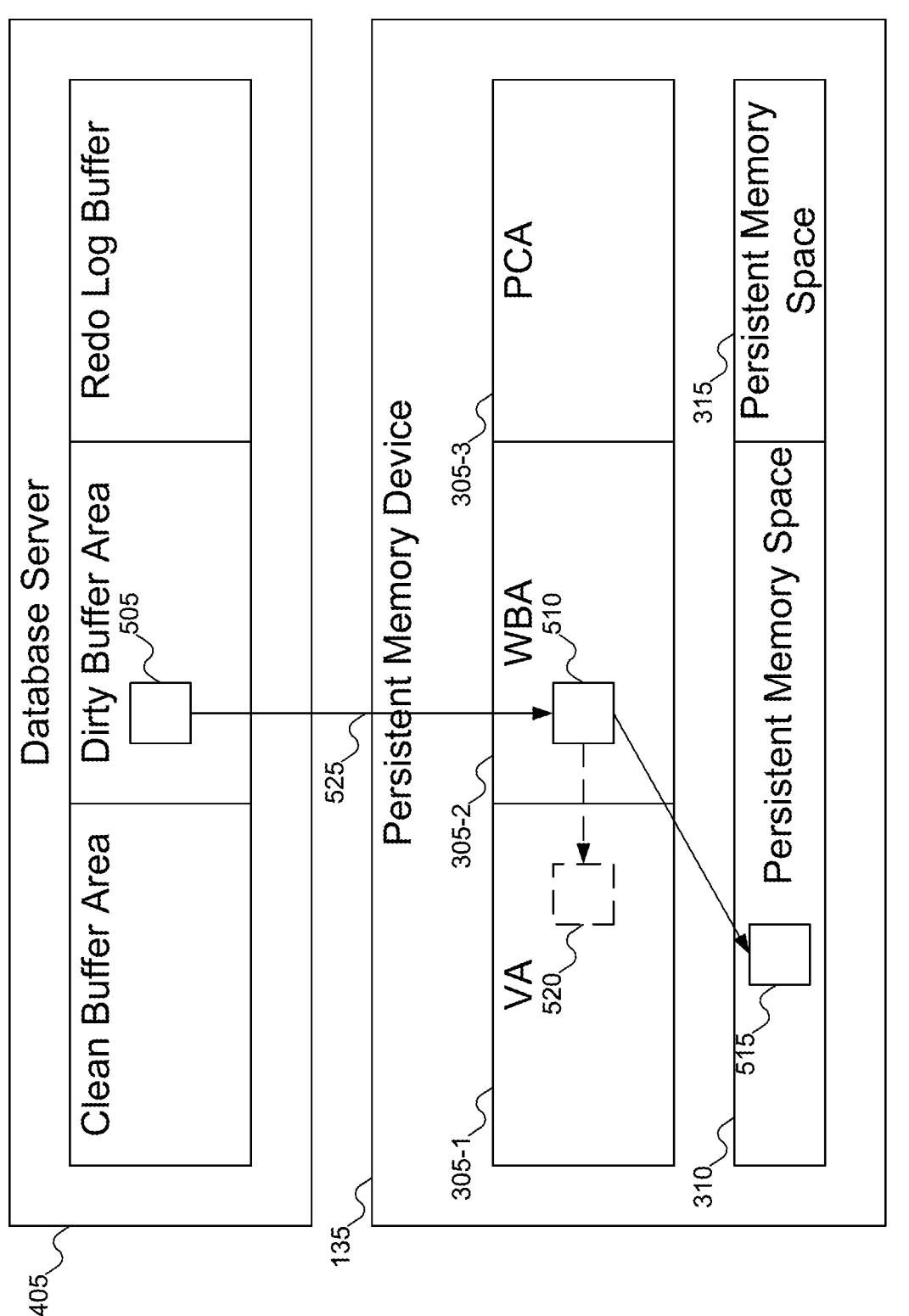
FIG. 5 shows the persistent memory device of FIG. 1 storing data, according to embodiments of the disclosure.

FIG. 5 shows persistent memory device 135 of FIG. 1 storing data, according to embodiments of the disclosure. In FIG. 5, database server 405 may send data 505 to persistent memory device 135 for storage. Data 505 may be imagined to be a modified form of the data as currently stored by persistent memory device 135.

If area 305-2 currently stores the original data that is now being updated (as may happen if, for example, the data was updated before, whether or not the changes have been committed to the non-volatile storage, or if area 305-2 was used to store the original data when database server 405 performed a load request), then controller 335 of FIG. 3 may update the original data to reflect the changes sent by database server 405. Thus, the original data in area 305-2 may be replaced with updated data 510 (which may also be called dirty data 510). At some point (either immediately, opportunistically, or when a checkpoint is triggered), data 510 may be copied into persistent memory space 310 as data 515 in the non-volatile storage to ensure that data 510 is not lost should power be interrupted. Optionally, controller 335 of FIG. 3 may also copy the updated data (once it is written to the non-volatile storage) into area 305-1 (as the data may be considered clean once it has been written to the non-volatile storage), shown as data 520.

If area 305-2 does not currently store the original data, then controller 335 of FIG. 3 may retrieve the original data from somewhere that it is stored and store the original data in area 305-2. But first, controller 335 of FIG. 3 may check to see if there is a free cache line (address) in area 305-2 where the original data may be stored. If there is no free cache line in area 305-2, then controller 335 of FIG. 3 may free up a cache line in area 305-2. Controller 335 of FIG. 3 may free a cache line in area 305-2 by selecting a cache line (again, using any desired approach, such as least recently used or least frequently used) in area 305-2. That data (assuming the data is dirty) may be written to the non-volatile storage. Since it may be expected that the data in the cache line selected might be requested again soon, in some embodiments of the disclosure the data (now clean, as it has been written to the non-volatile storage) may be copied to a cache line (address) in area 305-1; in other embodiments of the disclosure, the data (now clean) may be discarded (and retrieved later if needed again).

If the (clean) data is to be moved to area 305-1, then a cache line (address) in area 305-1 may be selected. This process may be the same as described above with reference to FIG. 4, the only difference being that the data is loaded into area 305-1 because of the store request from database server 405 being processed rather than a load request from database server 405.

Once controller 335 of FIG. 3 knows that there is at least one free cache line in area 305-2, controller 335 of FIG. 3 may allocate a cache line for the original data. The original data may then be copied into the cache line in area 305-2. Note that the original data may be found in the non-volatile storage, but the original data might also be found in area 305-1: for example, if the original data was previously requested by database server 405 in a load request and the original data has not yet been flushed from area 305-1 to free up a cache line for other data. If the original data is already in area 305-1, it may be more efficient to copy the data from area 305-1 into area 305-2, for several reasons. First, it may be faster to copy the original data between areas 305-1 and 305-2 than to load the data from the non-volatile storage into area 305-2. Second, as the original data is to be updated by the store request, the original data in area 305-1 may be deleted, freeing a cache line for other data.

Recall that earlier the capacities of areas 305 were described as configurable. One possibility is that the user might configure area 305-2 to have no capacity (a capacity of 0 bytes). This configuration might not necessarily be considered efficient, there might be situations where the system may should be configured to omit area 305-2. In that situation, there is no cache line available in area 305-2, and there is no possibility of freeing a cache line in area 305-2. Thus, controller 335 of FIG. 3 may write the data directly back to the non-volatile storage, as there may not be any other place to store the data.

In FIG. 4, when database server 405 requests data be loaded, it may be expected that the entire data may be loaded from the non-volatile storage into area 305-1 of the volatile storage and then sent to database server 405. But in FIG. 5, when data is to be stored, it might be that only a portion of the data is being updated. For example, database server 405 might have originally requests that 4 KB of data be loaded, but only change 200 B of that data. Database server 405 might send the entire 4 KB of data back to persistent memory device 135. But such an approach may be inefficient: if only 200 B has changed, then less than 5% of the original 4 KB of data has changed, or alternatively that roughly 95% of the data being sent back is already present in persistent memory device 135.

Instead, database server 405 may send back only the portions of the data that have been changed, along with information that identifies what data has been changed. For example, database server 405 might send back the 200 B of changed data, along with an offset into the original 4 KB of data indicating where the 200 B of changed data begins. In that situation, controller 335 of FIG. 3 may update the original data in area 305-2 with the changed data, to produce an updated data as stored in area 305-2. (Note that this change data is different from, although related to, redo log data that may be stored in area 305-3.)

Another concern when storing data is data churn. Data churn may occur when persistent memory device 135 only writes part of the data due to an interruption of power. To protect against data churn, when data is received, the data may be written first to a temporary storage space first, then copied into the non-volatile storage. Then, if power is interrupted, the data is already stored in a persistent location (if not the eventual destination): the temporary storage space. This temporary storage space may be termed a double write buffer. In some embodiments of the disclosure, area 305-3 may be used as the double write buffer (since data written into area 305-3 may be considered temporary data to be written to the non-volatile storage only in case of an interruption of power). In other embodiments of the disclosure, an additional non-volatile storage may be used as the double write buffer.

Figure 6:
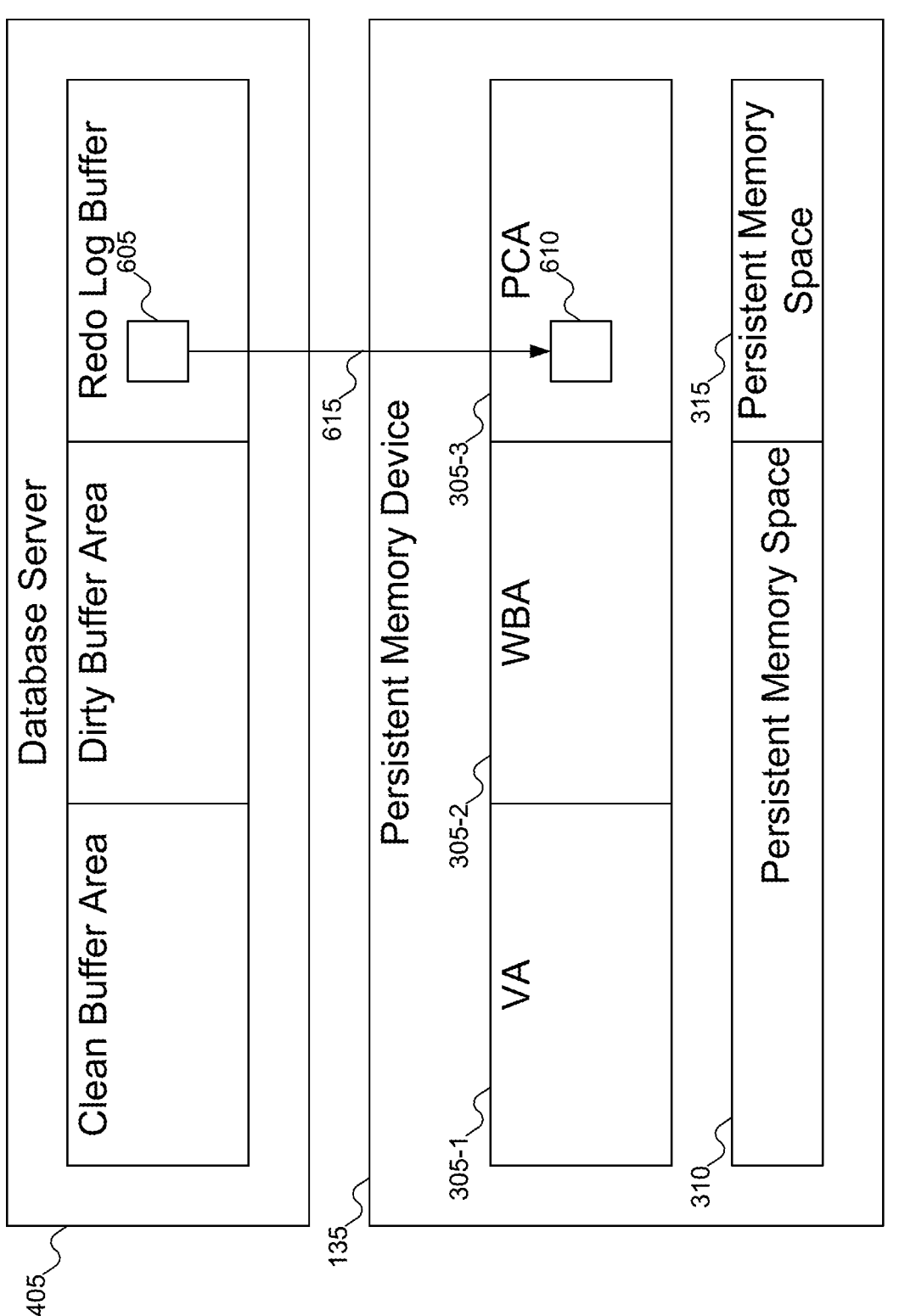
FIG. 6 shows the persistent memory device of FIG. 1 storing a redo log, according to embodiments of the disclosure.

FIG. 6 shows persistent memory device 135 of FIG. 1 storing a redo log, according to embodiments of the disclosure. In FIG. 6, database server 405 may send redo log 605 to persistent memory device 135. Controller 335 of FIG. 3 may store redo log 605 in area 305-3 as redo log 610. As discussed above, area 305-3 may be backed by backup power source 325 in case of a loss of power: should that happen, redo log 610 may be copied into persistent memory space 315 while backup power source 325 of FIG. 3 prevents loss of data in the volatile storage of persistent memory device 135.

Figure 7:
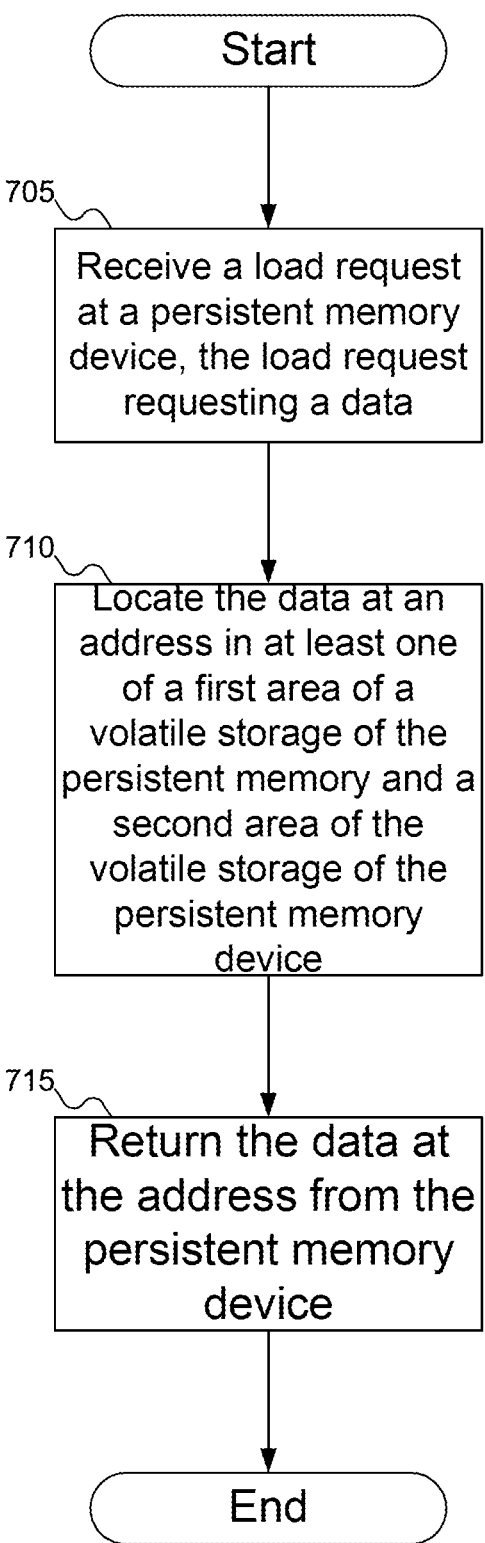
FIG. 7 shows a flowchart of an example procedure for processing a load request using the persistent memory device of FIG. 1, according to embodiments of the disclosure.

FIG. 7 shows a flowchart of an example procedure for processing a load request using persistent memory device 135 of FIG. 1, according to embodiments of the disclosure. In FIG. 7, at block 705, persistent memory device 135 of FIG. 1 may receive a load request from a host, such as database server 405 of FIG. 4. At block 710, controller 335 of FIG. 3 may be locate an address in the volatile storage of persistent memory device 135 of FIG. 1. Note that the data might be stored in area 305-2 of FIG. 3 if, for example, the host had previously sent data to be written for that logical identifier, but the data had not yet been committed to the non-volatile storage of persistent memory device 135 of FIG. 1. At block 715, persistent memory device 135 of FIG. 1 may return the data at the located address.

Figure 8:
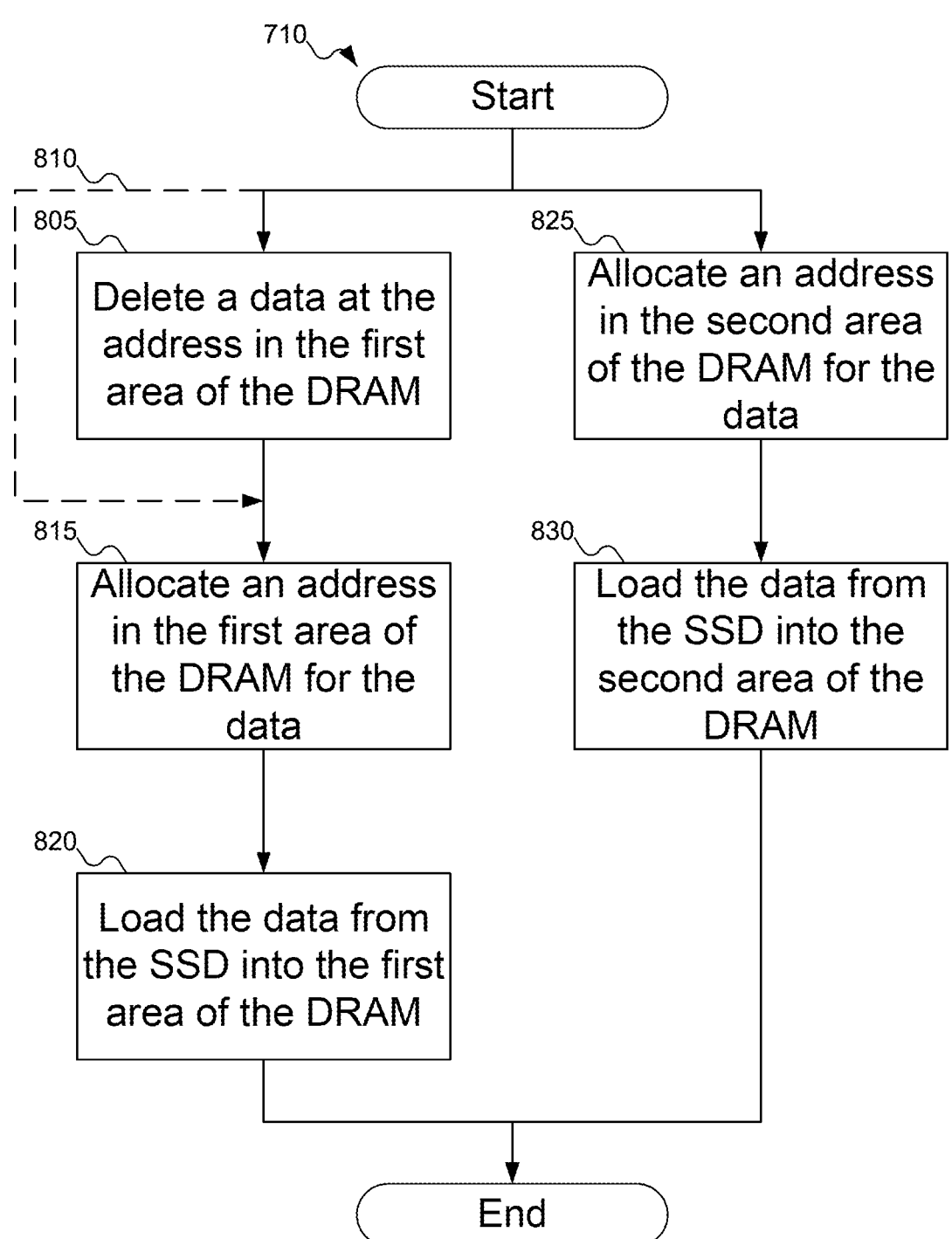
FIG. 8 shows a flowchart of an example procedure for loading data in the persistent memory device of FIG. 1, according to embodiments of the disclosure.

FIG. 8 shows a flowchart of an example procedure for loading data into persistent memory device 135 of FIG. 1, according to embodiments of the disclosure. At block 805, controller 335 of FIG. 3 may delete a data in area 305-1 of FIG. 3 in the volatile storage of persistent memory device 135 of FIG. 1. Recall that area 305-1 of FIG. 3 may be used to store clean data, so deleting the data at the address in area 305-1 of FIG. 3 should not result in any potential data loss. Note that if a cache line is already free, then block 805 may be skipped, as shown by dashed line 810. At block 815, controller 335 of FIG. 3 may select an address in area 305-1 of FIG. 3 and allocate storage for the requested data. Finally, at block 820, controller 335 of FIG. 3 may load the data from the non-volatile storage into the allocated address in area 305-1 of FIG. 3.

Alternatively, if area 305-1 of FIG. 3 does not have any free space but controller 335 of FIG. 3 does not want to delete any data from area 305-1 of FIG. 3, then at block 825 controller 335 of FIG. 3 may allocate an address in area 305-2 of FIG. 3, and at block 830 controller 335 of FIG. 3 may load the data from the non-volatile storage into the allocated address in area 305-2 of FIG. 3. Note that if an address is allocated in area 305-2 of FIG. 3, in general that address may be expected to be free: as area 305-2 of FIG. 3 may be used to store dirty data, controller 335 of FIG. 3 should not delete data from an address 305-2 of FIG. 3 without first ensuring that the data has been copied into the non-volatile storage, or data might be lost.

FIG. 9 shows a flowchart of an example procedure for processing a store request using persistent memory device 135 of FIG. 1, according to embodiments of the disclosure. In FIG. 9, at block 905, persistent memory device 135 of FIG. 1 may receive a store request from a host, such as database server 405 of FIG. 4. At block 910, controller 335 of FIG. 3 may be locate an address in area 305-2 of FIG. 3 of the volatile storage of persistent memory device 135 of FIG. 1 where the original data is stored. At block 715, persistent memory device 135 of FIG. 1 may update the original data at the located address using the change data.

Figure 10A:
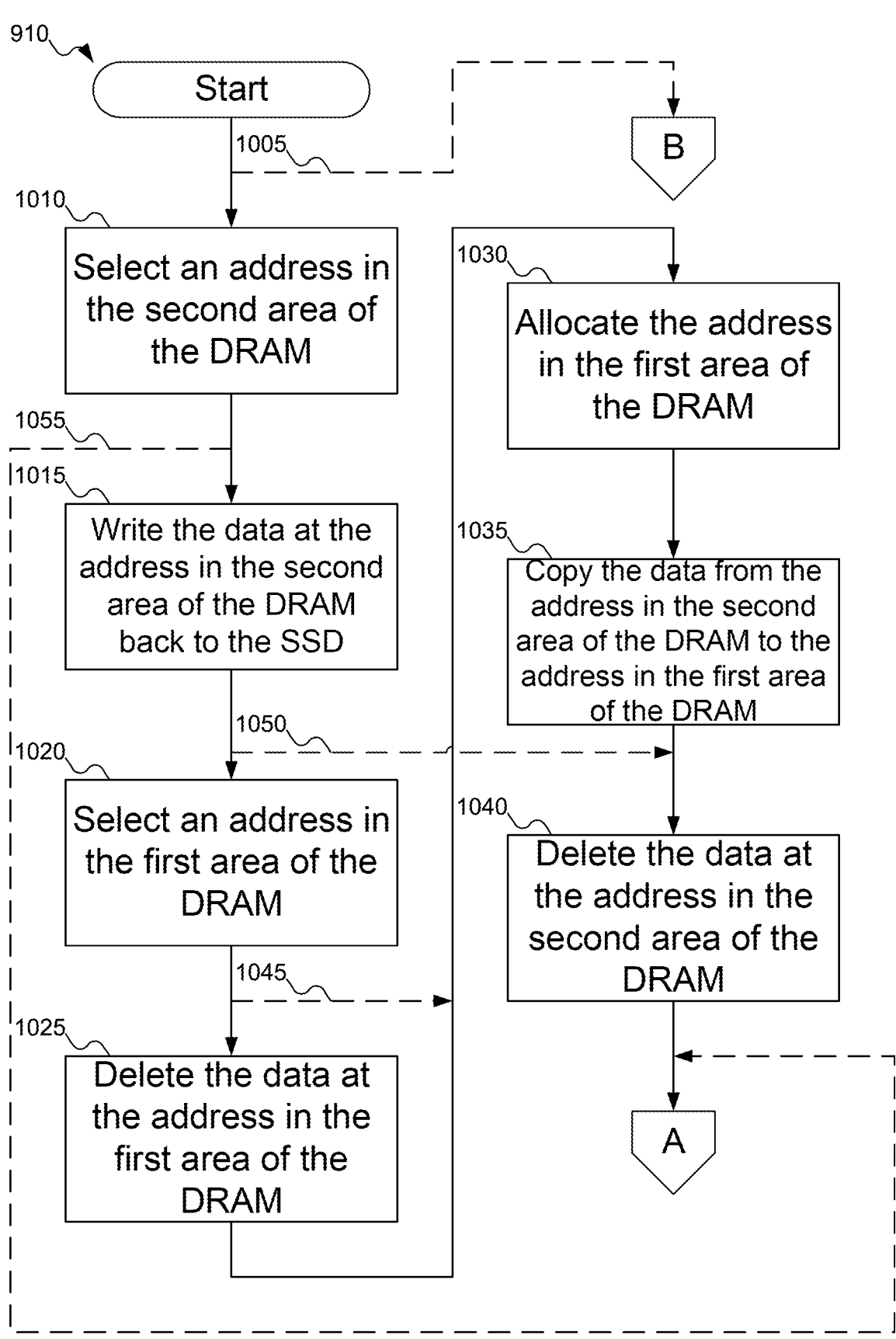
FIG. 10A shows a flowchart of an example procedure for loading data into a second area of the persistent memory device of FIG. 1, according to embodiments of the disclosure.
Figure 10B:
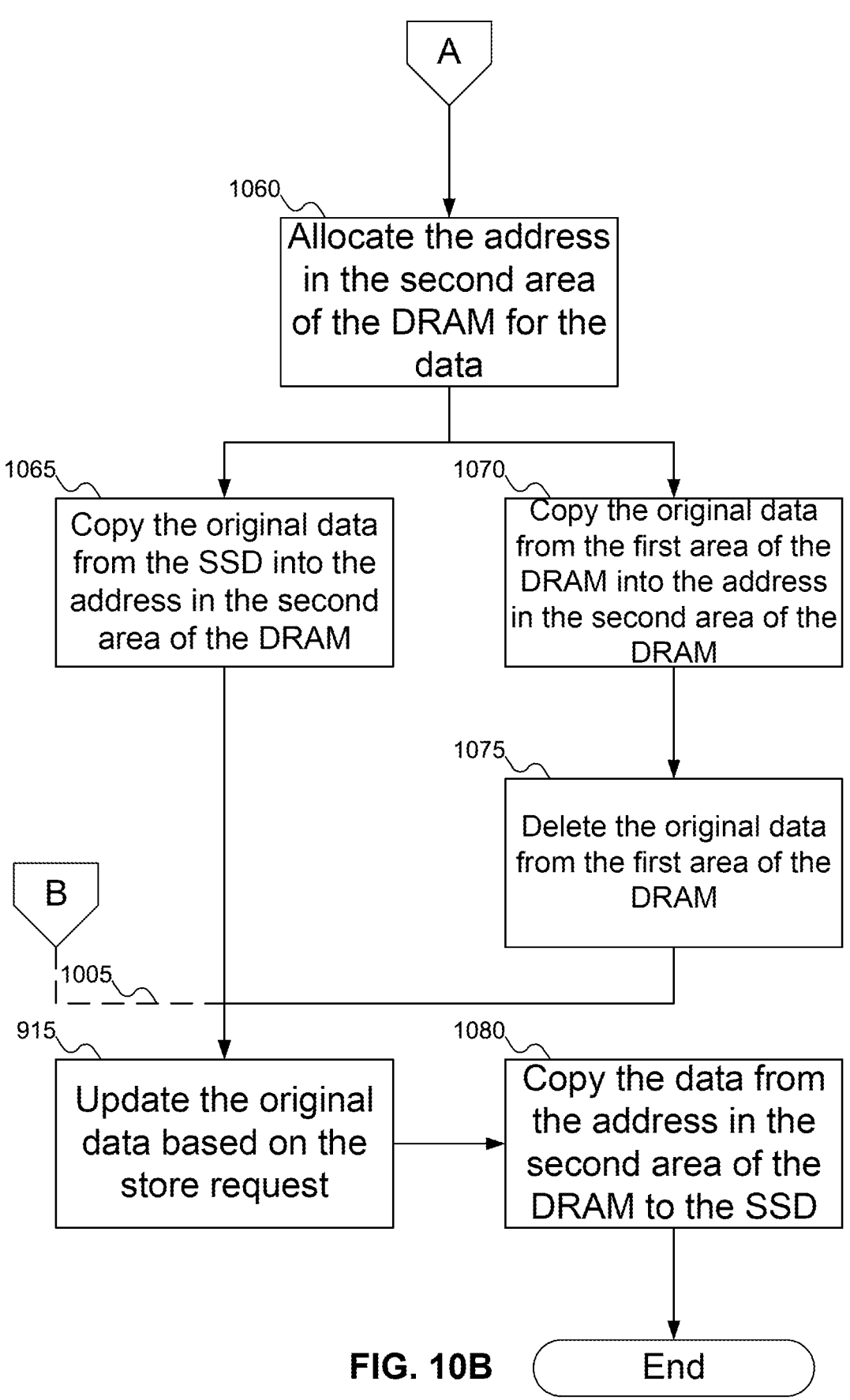
FIG. 10B continues the flowchart of an example procedure for loading data into a second area of the persistent memory device of FIG. 1, according to embodiments of the disclosure.

FIGS. 10A-10B show a flowchart of an example procedure for loading data into area 305-2 of FIG. 3 of persistent memory device 135 of FIG. 1, according to embodiments of the disclosure. In FIG. 10A, controller 335 of FIG. 3 may first determine if the original data is already in area 305-2 of FIG. 3. If so, then many blocks may be skipped, as shown by dashed line 1005. Otherwise, at block 1010, controller 335 of FIG. 3 may select an address in area 305-2 of FIG. 3. At block 1015, controller 335 of FIG. 3 may write the data stored at the selected address of area 305-2 of FIG. 3 to the non-volatile storage. At block 1015, controller 335 of FIG. 3 may write the data stored at the selected address in area 305-2 of FIG. 3 to the non-volatile storage.

As the data currently stored at the address in area 305-2 of FIG. 3 may now be considered clean (as the data has been written to the non-volatile storage, the data may be moved to area 305-1 of FIG. 3 to free up a cache line in area 305-2 of FIG. 3. At block 1020, controller 335 of FIG. 3 may select an address in area 305-1 of FIG. 3. At block 1025, controller 335 of FIG. 3 may delete a data currently stored at the address in area 305-1 of FIG. 3. At block 1030, controller 335 of FIG. 3 may allocate the address in area 305-1 of FIG. 3, and at block 1035 controller 335 of FIG. 3 may copy the data from the address in area 305-2 of FIG. 3 into the address in area 305-1 of FIG. 3. Finally, at block 1040, the data stored at the address in area 305-2 of FIG. 3 may be deleted.

Block 1025 represents an operation to be performed if the address selected in area 305-1 of FIG. 3 at block 1020 already stores data. If the address in area 305-1 of FIG. 3 selected at block 1020 does not currently store data, then block 1025 may be omitted, as shown by dashed line 1045. Similarly, blocks 1020 through 1035 represent operations to be performed to move data from area 305-2 of FIG. 3 to area 305-1 of FIG. 3, after the dirty data has been written to the non-volatile storage. If the previously dirty data is not moved from area 305-2 of FIG. 3 to area 305-1 of FIG. 3, then blocks 1020 through 1035 may be omitted, as shown by dashed line 1050. Similarly, blocks 1015 through 1040 represent operations to be performed if the address selected in area 305-2 of FIG. 3 at block 1010 already stores data. If the address in area 305-2 of FIG. 3 selected at block 1010 does not currently store data, then blocks 1015 through 1040 may be omitted, as shown by dashed line 1055.

At block 1060 (FIG. 10B), controller 335 of FIG. 3 may allocate the address in area 305-2 of FIG. 3 for the original data. At block 1065, if the original data is not currently stored in the volatile storage of persistent memory device 135 of FIG. 1, controller 335 of FIG. 3 may copy the data from the non-volatile storage of persistent memory device 135 of FIG. 1 into the address in area 305-2 of FIG. 3. Alternatively, if the original data is currently stored at an address in area 305-1 of FIG. 3, at block 1070 controller 335 of FIG. 3 may copy the original data from area 305-1 of FIG. 3 into the address in area 305-2 of FIG. 3, and at block 1075 controller 335 of FIG. 3 may delete the original data from area 305-1 of FIG. 3.

As noted above, blocks 1010 of FIG. 10A through blocks 1065/1075 of FIG. 10B assume that the original data is not currently in area 305-2 of FIG. 3. If the original data is already in area 305-2 of FIG. 3 (for example, if the data was previously updated by database server 405 of FIG. 4, whether or not those updates have been committed to the non-volatile storage of persistent memory device 135 of FIG. 1), then blocks 1010 of FIG. 10A through blocks 1065/1075 of FIG. 10B may be omitted as shown by dashed lines 1005.

At block 915, as described above with reference to FIG. 9, controller 335 of FIG. 3 may update the original data with the changed data provided by the host. Finally, at block 1080, controller 335 of FIG. 3 may eventually copy the updated data from area 305-2 of FIG. 3 into the non-volatile storage of persistent memory device 135 of FIG. 1 (at which point the data may be considered clean rather than dirty). Note that in embodiments of the disclosure, block 1080 may be performed immediately, when a checkpoint is triggered, or opportunistically based on the utilization of persistent memory device 135 of FIG. 1.

Figure 11:
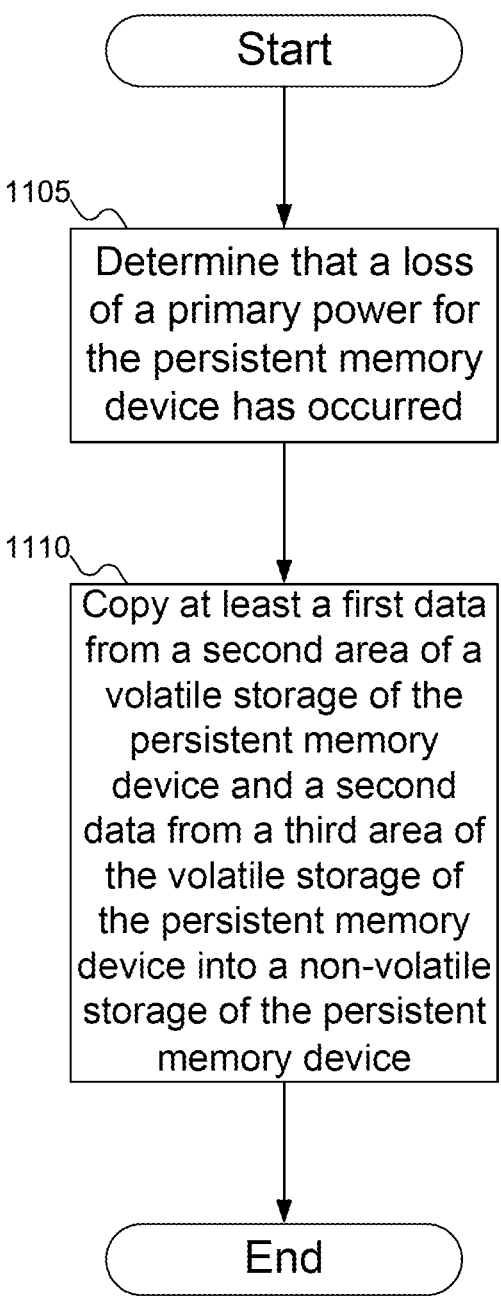
FIG. 11 shows a flowchart of an example procedure for storing data to non-volatile storage in the event of a power interruption of the persistent memory device of FIG. 1, according to embodiments of the disclosure.

FIG. 11 shows a flowchart of an example procedure for storing data to non-volatile storage in the event of a power interruption of persistent memory device 135 of FIG. 1, according to embodiments of the disclosure. In FIG. 11, at block 1105, controller 335 of FIG. 3 may determine that there has been an interruption in the primary power to persistent memory device 135 of FIG. 1. At block 1110, controller 335 of FIG. 3 may copy data from areas 305-2 and 305-3 of FIG. 3 into the non-volatile storage of persistent memory device 135 of FIG. 1. Persistent memory device 135 of FIG. 1 may rely on power from backup power source 325 of FIG. 3 to retain data in area 305-2 and 305-3 of FIG. 3 long enough for controller 335 of FIG. 3 to copy the data from areas 305-2 and 305-3 of FIG. 3 into the non-volatile storage of persistent memory device 135 of FIG. 1.

In FIGS. 7-11, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a persistent memory device. The persistent memory device may be divided into different areas with different properties. Some areas may be backed by a backup power source in case of power interruption and others may not. Some areas may be pinned and others may not. Data may be loaded/stored in areas based on the type of data: clean data may be stored in an area that is not backed by the backup power source, dirty data and redo logs may be stored in areas that are backed by the backup power source. The sizes of each area may be configurable. The persistent memory device may offer a technical advantage in that data may be retrieved from volatile storage, such as DRAM, which has a low latency, but still be protected against power interruption with a non-volatile storage.

The present disclosure introduces a persistent memory (PMEM) 135 of FIG. 1 based on NAND and Compute Express Link (CXL) technology which may, in some embodiments, provide a load/store interface. In some embodiments, a portion of NAND space may be used as a persistent memory space. In some embodiments, the persistent memory may have a user-configurable DRAM cache which may consist of three spaces with different characteristics. In some embodiments, the persistent memory may have multiple queues that are larger than the number of hardware threads available in a CPU to support concurrent accesses to the device. In some embodiments, the persistent memory may have internal/external capacitors for a port of DRAM called write-back area (WBA), and fixed cache area (PCA) persisting in case of power failure.

Databases may be stored in the form of data blocks in storage. To process a user query, the database server may first try to find a data block containing information from a local buffer cache of database server where the data block is stored in memory. If the data block is not in the local buffer cache, the database server may request the data block from the storage server using the data block metadata information such as volumes and LBAs. Since this read operation may be on the critical path, the latency may be critical to overall performance. Examples may use two remote direct memory access (ROMA) operations which may reduce the access latency significantly.

Once the database server receives the data block from the storage server, it may store the data block in its local buffer cache and may process the data block. At this point, updates on the data block may occur and the data block may be dirty.

When the data block is modified and becomes dirty, the database server may capture all changes made by the database server for this transaction and may create a redo log entry in the redo log buffer. The changes to data blocks may be persisted when the database server writes a redo log. Since the log write may be on the critical path, the latency should not be compromised.

However, the modified data blocks may not be written to storage immediately when the transaction is committed until a checkpoint operation is invoked. That is, the dirty data blocks are still in the database server. In the meantime, a background process may monitor the buffer cache utilization and may writes dirty data blocks to the storage servers when checkpoint conditions are met. A checkpoint operation may not write all dirty data blocks at once.

When the storage server stores a dirty data block, it may first write to a temporary storage space called a double write buffer (DWB) to prevent churn writes in case of failure. That is, the storage server first writes data to the buffer and then copies the data in the double-write buffer to the original data blocks.

In some embodiments of the disclosure, PMEM 135 of FIG. 1 may serve three use cases. First, PMEM may reduce the delay in accessing data blocks from the storage server. Second, PMEM may reduce the latency of redo log writes with small data. Finally, PMEM may reduce the amount of writes of hot data blocks to the flash cache.

Embodiments of the disclosure may include a Compute Express Link (CXL)-SSD to provide one persistent memory space based on NAND backing store and DRAM cache. The NAND space may be advertised as a persistent memory space of the device. For example, in some embodiments of the disclosure, the device may have a 768 GB persistent memory space. The persistent memory space may be backed by of 768 GB NAND space.

The PMEM 135 of FIG. 1 may have a DRAM cache to boost performance. The PMEM also may provide an interface to control a DRAM cache. The DRAM may have 3 areas with different properties: volatile area (VA), write-back area (WBA), and fixed cache area (PCA).

The volatile area (VA) 305-1 of FIG. 3 is a cache space that is not protected in case of power failure, and may be used to improve read performance of persistent memory. For example, this space may be used to store clean data blocks of database. If data blocks are clean, it's okay to lose them because the data blocks are already persisted in this device or other storage devices.

Write Back Area (WBA) 305-2 of FIG. 3 may be used to improve write performance and endurance of persistent memory. Data in this space may be protected in case of power failure. That is, all data in WBA may be written back to NAND in case of power failure. The maximum WBA size may be device-specific and may be determined by internal/external capacitor capacity and NAND performance. Users may configure the WBA size using an admin command via CXL.IO. For example, dirty data blocks of database should be stored in this space. The actual WBA size may be determined by the minimum of the maximum WBA size and the user configured WBA size. If the total amount of dirty data blocks exceed the allocated WBA size, the aged data may be written back to NAND to free up the space for new writes. The smaller WBA size is, the more NAND writes may be generated.

Similar to Write Back Area (WBA), Pinned Cache Area (PCA) 305-3 of FIG. 3 may be used to improve write performance and endurance of persistent memory. Data in this space may be protected in case of power failure. That is, all data in PCA may be written back to NAND in case of power outage. Note that data stored in PCA may not be written back to NAND under a normal situation. Data from the PCA may be written back to NAND only when an event such as a power outage, log switch, etc. is detected. Since PCA may not be normally written back to NAND, this space should be used for temporary data such as redo logs and double write buffers. The maximum PCA size may be device-specific and may be determined by internal/external capacitor capacity and NAND performance. Users may configure the PCA size using an admin command via CXL.IO. The actual CPA size may be determined by the minimum of the maximum PCA size and the user configured PCA size. If the redo log size and double write buffer size exceed the allocated PCA size, an error may be returned.

To support concurrent load/store operations, the PMEM 135 of FIG. 1 may have multiple queues.

In addition to the NAND space that may be advertised as a persistent memory space of the device, the device may use more NAND space to improve the endurance of device. For example, if a device has the 4 TB NAND capacity, the persistent memory space backed by NAND is 768 GB and the remaining 3.5 TB NAND space may be invisible and used for endurance. The size of invisible NAND space may be determined by WBA cache miss rate, NAND type such as SLC (Single Level Cell), MLC (Multi-Level Cell), and TLC (Triple Level Cell), warranty period such as 5 year DWPD (Drive Write Per Day), etc.

The DRAM cache space may be divided into three areas: volatile area (VA), write-back area (WBA), and fixed cache area (PCA). Users may configure the cache using an admin command via CXL.IO. An example such command may be INT cxlssd_create_cache (CACHE_TYPE type, UINT size, UINT *address). Here, type may be CXLSSD_CACHE_T-YPE_VA, CXLSSD_CACHE_TYPE_WBA, or CXLSSD_CACHE_TYPE_PCA. Size may be a multiple of 512 bytes. address may be the offset of the start address of cache in byte from the starting from 0. By default the entire DRAM cache is allocated for VA. So, users may specify the size for WBA and PCA. There may be more than one of each of VA, WBA, and PCA in theory. If the command is successful, it returns a cache ID. Embodiments of the disclosure may use one each of VA, WBA, and PCA for simplicity.

The cache information may be stored in Cache Space Allocation Table. The table maintains (cache type, offset, size). The index of table may be used as a cache ID.

The following discussion is intended to provide a brief, general description of a suitable machine or machines in which certain aspects of the disclosure may be implemented.

The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a persistent memory device, comprising:
a cache coherent interconnect interface;
a volatile storage including at least a first area and a second area;
a backup power source configured to provide backup power selectively to the second area of the volatile storage;
a non-volatile storage; and
a controller to control the volatile storage and the non-volatile storage,
wherein the persistent memory device is configured to use the backup power source while transferring a data from the second area of the volatile storage to the non-volatile storage based at least in part on a loss of a primary power for the persistent memory device.

Statement 2. An embodiment of the disclosure includes the persistent memory device according to statement 1, wherein:
the second area includes an unpinned area;
the volatile storage further includes a third area, the third area including a pinned area; and
the backup power source is configured to provide backup power selectively to the second area of the volatile storage and the third area of the volatile storage.

Statement 3. An embodiment of the disclosure includes the persistent memory device according to statement 1, wherein:
the first area includes an unpinned area; and
the volatile storage further includes a third area, the third area including a pinned area.

Statement 4. An embodiment of the disclosure includes the persistent memory device according to statement 1, wherein the volatile storage includes a dynamic random access memory (DRAM).

Statement 5. An embodiment of the disclosure includes the persistent memory device according to statement 1, wherein the non-volatile storage includes a Solid State Drive (SSD).

Statement 6. An embodiment of the disclosure includes the persistent memory device according to statement 1, wherein the cache coherent interconnect interface includes a Compute Express Link (CXL) interface.

Statement 7. An embodiment of the disclosure includes the persistent memory device according to statement 1, wherein the backup power source is configured to not provide backup power to the first area of the volatile storage.

Statement 8. An embodiment of the disclosure includes the persistent memory device according to statement 1, wherein:
the first area is configured to store clean data; and
the second area is configured to store dirty data.

Statement 9. An embodiment of the disclosure includes the persistent memory device according to statement 8, wherein:
the second area includes an unpinned area;
the volatile storage further includes a third area, the third area including a pinned area and configured to store a transient dirty data;
the backup power source is configured to provide backup power selectively to the second area of the volatile storage and the third area of the volatile storage.

Statement 10. An embodiment of the disclosure includes the persistent memory device according to statement 9, wherein the persistent memory device is configured to use the backup power source while transferring at least one of a first data from the second area of the volatile storage or a second data from the third area of the volatile storage to the non-volatile storage based at least in part on a loss of a primary power for the persistent memory device.

Statement 11. An embodiment of the disclosure includes the persistent memory device according to statement 1, wherein the cache coherent interconnect interface is configured to receive a load request for a data and to return the data from at least one of the first area or the second area.

Statement 12. An embodiment of the disclosure includes the persistent memory device according to statement 11, wherein the controller is configured to copy the data from the non-volatile storage to the first area based at least in part on the data not being in the first area.

Statement 13. An embodiment of the disclosure includes the persistent memory device according to statement 1, wherein:
the cache coherent interconnect interface is configured to receive a store request for a change data; and
the controller is configured to update an original data in an address in the second area to produce an updated data based at least in part on the change data.

Statement 14. An embodiment of the disclosure includes the persistent memory device according to statement 13, wherein the controller is configured to allocate the address in the second area based at least in part on the original data not being in the second area.

Statement 15. An embodiment of the disclosure includes the persistent memory device according to statement 14, wherein the controller is configured to copy an existing data at the address to at least one of the non-volatile storage and the first area based at least in part on the second area not having any unallocated addresses.

Statement 16. An embodiment of the disclosure includes the persistent memory device according to statement 15, wherein the controller is configured to discard an existing data at the address in the first area based at least in part on the first area not having any unallocated addresses.

Statement 17. An embodiment of the disclosure includes the persistent memory device according to statement 14, wherein the controller is further configured to copy the original data from at least one of the first area or the non-volatile storage to the address.

Statement 18. An embodiment of the disclosure includes the persistent memory device according to statement 14, wherein the controller is further configured to write the updated data to the non-volatile storage.

Statement 19. An embodiment of the disclosure includes the persistent memory device according to statement 18, wherein the controller is further configured to write the updated data to the non-volatile storage based at least in part on opportunistic write availability.

Statement 20. An embodiment of the disclosure includes the persistent memory device according to statement 18, wherein the controller is further configured to write the updated data to the non-volatile storage based at least in part on a checkpoint being triggered.

Statement 21. An embodiment of the disclosure includes the persistent memory device according to statement 1, wherein:
the cache coherent interconnect interface is configured to receive a store request for a transient dirty data; and
the controller is configured to store the transient dirty data at an address in the third area.

Statement 22. An embodiment of the disclosure includes the persistent memory device according to statement 1, wherein a first size of the first area and a second size of the second area are configurable by a user.

Statement 23. An embodiment of the disclosure includes the persistent memory device according to statement 22, wherein the second size of the second area is based at least in part on an operating duration of the backup power source.

Statement 24. An embodiment of the disclosure includes the persistent memory device according to statement 1, wherein:
the persistent memory device further comprises a second non-volatile storage,
wherein the non-volatile storage is configured as a cache for the second non-volatile storage.

Statement 25. An embodiment of the disclosure includes the persistent memory device according to statement 24, wherein:
the non-volatile storage includes a first capacity and a first latency; and
the second non-volatile storage includes a second capacity and a second latency,
wherein the second capacity is greater than the first capacity and the second latency is greater than the first latency.

Statement 26. An embodiment of the disclosure includes the persistent memory device according to statement 1, wherein:
the volatile storage includes a first capacity and a first latency; and
the non-volatile storage includes a second capacity and a second latency,
wherein the second capacity is greater than the first capacity and the second latency is greater than the first latency.

Statement 27. An embodiment of the disclosure includes a method, comprising:
receiving a load request at a persistent memory device, the load request requesting a data;
locating the data at an address in at least one of a first area of a volatile storage of the persistent memory or a second area of the volatile storage of the persistent memory device; and
returning the data at the address from the persistent memory device,
wherein the persistent memory device includes a non-volatile storage, and
wherein the second area of the volatile storage of the persistent memory device is backed by a backup power source configured to provide backup power selectively to the second area of the volatile storage based at least in part on a loss of a primary power for the persistent memory device.

Statement 28. An embodiment of the disclosure includes the method according to statement 27, wherein receiving the load request at the persistent memory device includes receiving the load request at a cache coherent interconnect interface of the persistent memory device.

Statement 29. An embodiment of the disclosure includes the method according to statement 28, wherein receiving the load request at the cache coherent interconnect interface of the persistent memory device includes receiving the load request at a Compute Express Link (CXL) interface of the persistent memory device.

Statement 30. An embodiment of the disclosure includes the method according to statement 27, wherein the backup power source is configured to not provide backup power to the first area of the volatile storage.

Statement 31. An embodiment of the disclosure includes the method according to statement 27, wherein:
locating the data at the address in at least one of the first area of the volatile storage of the persistent memory and the second area of the volatile storage of the persistent memory device includes locating the data at the address in at least one of the first area of a Dynamic Random Access Memory (DRAM) of the persistent memory and the second area of the DRAM of the persistent memory device; and
the non-volatile storage includes a Solid State Drive (SSD).

Statement 32. An embodiment of the disclosure includes the method according to statement 27, wherein locating the data at the address in at least one of the first area of the volatile storage of the persistent memory and the second area of the volatile storage of the persistent memory device includes:
loading the data into the address in the first area of the volatile storage of the persistent memory device from the non-volatile storage of the persistent memory device; and
locating the data at the address in the first area of the volatile storage of the persistent memory device.

Statement 33. An embodiment of the disclosure includes the method according to statement 32, wherein loading the data into the address in the first area of the volatile storage of the persistent memory device from the non-volatile storage of the persistent memory device includes allocating the address in the first area of the volatile storage of the persistent memory device.

Statement 34. An embodiment of the disclosure includes the method according to statement 32, wherein loading the data into the address in the first area of the volatile storage of the persistent memory device from the non-volatile storage of the persistent memory device includes deleting a second data from the address in the first area of the volatile storage of the persistent memory device.

Statement 35. An embodiment of the disclosure includes the method according to statement 27, wherein locating the data at the address in at least one of the first area of a volatile storage of the persistent memory and the second area of the volatile storage of the persistent memory device includes:

loading the data into the address in the second area of the volatile storage of the persistent memory device from the non-volatile storage of the persistent memory device based at least in part on the first area of the volatile storage of the persistent memory device being full and the address in the second area of the volatile storage of the persistent memory device being free; and locating the data at the address in the second area of the volatile storage of the persistent memory device.

Statement 36. An embodiment of the disclosure includes the method according to statement 35, wherein loading the data into the address in the second area of the volatile storage of the persistent memory device from the non-volatile storage of the persistent memory device includes allocating the address in the second area of the volatile storage of the persistent memory device.

Statement 37. An embodiment of the disclosure includes a method, comprising:

receiving a store request at a persistent memory device, the store request including a change data;

locating an original data at an address in a first area of a volatile storage of the persistent memory device; and updating the original data at the address in the first area of the volatile storage of the persistent memory device with the change data to produce an updated data, wherein the persistent memory device includes a non-volatile storage, wherein the first area of the volatile storage of the persistent memory device is backed by a backup power source configured to provide backup power selectively to the first area of the volatile storage based at least in part on a loss of a primary power for the persistent memory device, and wherein the volatile storage of the persistent memory device includes a second area.

Statement 38. An embodiment of the disclosure includes the method according to statement 37, wherein receiving the store request at the persistent memory device includes receiving the store request at a cache coherent interconnect interface of the persistent memory device.

Statement 39. An embodiment of the disclosure includes the method according to statement 38, wherein receiving the store request at the cache coherent interconnect interface of the persistent memory device includes receiving the store request at a Compute Express Link (CXL) interface of the persistent memory device.

Statement 40. An embodiment of the disclosure includes the method according to statement 37, wherein the backup power source is configured to not provide backup power to the first area of the volatile storage.

Statement 41. An embodiment of the disclosure includes the method according to statement 37, wherein:

locating the original data at the address in the first area of the volatile storage of the persistent memory device includes locating the original data at the address in the first area of a Dynamic Random Access Memory (DRAM) of the persistent memory device;

updating the original data at the address in the first area of the volatile storage of the persistent memory device with the change data to produce the updated data includes updating the original data at the address in the first area of the DRAM of the persistent memory device with the change data to produce the updated data; and the non-volatile storage includes a Solid State Drive (SSD).

Statement 42. An embodiment of the disclosure includes the method according to statement 37, wherein locating the original data at the address in the first area of the volatile storage of the persistent memory device includes loading the original data into the address in the first area of the volatile storage of the persistent memory device.

Statement 43. An embodiment of the disclosure includes the method according to statement 42, wherein loading the original data into the address in the first area of the volatile storage of the persistent memory device includes allocating the address in the first area of the volatile storage of the persistent memory device.

Statement 44. An embodiment of the disclosure includes the method according to statement 42, wherein loading the original data into the address in the first area of the volatile storage of the persistent memory device includes evicting a first data at the address in the first area of the volatile storage of the persistent memory device.

Statement 45. An embodiment of the disclosure includes the method according to statement 44, wherein evicting the first data at the address in the first area of the volatile storage of the persistent memory device includes writing the first data to the non-volatile storage of the persistent memory device.

Statement 46. An embodiment of the disclosure includes the method according to statement 45, wherein evicting the first data at the address in the first area of the volatile storage of the persistent memory device further includes deleting the first data at the address in the first area of the volatile storage of the persistent memory device.

Statement 47. An embodiment of the disclosure includes the method according to statement 45, wherein evicting the first data at the address in the first area of the volatile storage of the persistent memory device further includes copying the first data at the address in the first area of the volatile storage of the persistent memory device into a first address in the second area of the volatile storage of the persistent memory device.

Statement 48. An embodiment of the disclosure includes the method according to statement 47, wherein copying the first data at the address in the first area of the volatile storage of the persistent memory device into the first address in the second area of the volatile storage of the persistent memory device includes allocating the first address in the second area of the volatile storage of the persistent memory device.

Statement 49. An embodiment of the disclosure includes the method according to statement 47, wherein copying the first data at the address in the first area of the volatile storage of the persistent memory device into the first address in the second area of the volatile storage of the persistent memory device includes deleting a third data at the first address in the second area of the volatile storage of the persistent memory device.

Statement 50. An embodiment of the disclosure includes the method according to statement 42, wherein loading the original data into the address in the first area of the volatile storage of the persistent memory device includes copying the original data into the address in the first area of the volatile storage of the persistent memory device from at least one of a first address in the second area of the volatile storage of the persistent memory device or the non-volatile storage of the persistent memory device.

Statement 51. An embodiment of the disclosure includes the method according to statement 50, wherein copying the original data into the address in the first area of the volatile storage of the persistent memory device from at least one of a first address in the second area of the volatile storage of the persistent memory device or the non-volatile storage of the persistent memory device includes:

copying the original data into the address in the first area of the volatile storage of the persistent memory device from the second area of the volatile storage of the persistent memory device; and deleting the original data from the second area of the volatile storage of the persistent memory device.

Statement 52. An embodiment of the disclosure includes the method according to statement 50, wherein copying the original data into the address in the first area of the volatile storage of the persistent memory device from at least one of a first address in the second area of the volatile storage of the persistent memory device or the non-volatile storage of the persistent memory device includes copying the original data into the address in the first area of the volatile storage of the persistent memory device from the non-volatile storage of the persistent memory device.

Statement 53. An embodiment of the disclosure includes the method according to statement 42, further comprising copying the updated data from the first area of the volatile storage of the persistent memory device into the non-volatile storage of the persistent memory device.

Statement 54. An embodiment of the disclosure includes the method according to statement 53, wherein copying the updated data from the first area of the volatile storage of the persistent memory device into the non-volatile storage of the persistent memory device includes copying the updated data from the first area of the volatile storage of the persistent memory device into the non-volatile storage of the persistent memory device based at least in part on opportunistic write availability.

Statement 55. An embodiment of the disclosure includes the method according to statement 53, wherein copying the updated data from the first area of the volatile storage of the persistent memory device into the non-volatile storage of the persistent memory device includes copying the updated data from the first area of the volatile storage of the persistent memory device into the non-volatile storage of the persistent memory device based at least in part on a checkpoint being triggered.

Statement 56. An embodiment of the disclosure includes a method, comprising:

determining that a loss of a primary power for the persistent memory device has occurred; and copying at least a first data from a first area of a volatile storage of the persistent memory device and a first data from a second area of the volatile storage of the persistent memory device into a non-volatile storage of the persistent memory device.

Statement 57. An embodiment of the disclosure includes the method according to statement 56, wherein copying at least the first data from the first area of the volatile storage of the persistent memory device and the first data from the second area of the volatile storage of the persistent memory device into the non-volatile storage of the persistent memory device includes copying at least the first data from the first area of the volatile storage of the persistent memory device and the first data from the second area of the volatile storage of the persistent memory device into the non-volatile storage of the persistent memory device using a backup power source of the persistent memory device.

Statement 58. An embodiment of the disclosure includes the method according to statement 56, wherein copying at least the first data from the first area of the volatile storage of the persistent memory device and the first data from the second area of the volatile storage of the persistent memory device into the non-volatile storage of the persistent memory device includes copying at least the first data from the first area of a Dynamic Random Access Memory (DRAM) of the persistent memory device and the first data from the second area of the DRAM of the persistent memory device into a Solid State Drive (SSD) of the persistent memory device.

Statement 59. An embodiment of the disclosure includes an article, comprising a non-transitory storage medium, the non-transitory storage medium having stored thereon instructions that, when executed by a machine, result in:

receiving a load request at a persistent memory device, the load request requesting a data;

locating the data at an address in at least one of a first area of a volatile storage of the persistent memory or a second area of the volatile storage of the persistent memory device; and returning the data at the address from the persistent memory device, wherein the persistent memory device includes a non-volatile storage, and wherein the second area of the volatile storage of the persistent memory device is backed by a backup power source configured to provide backup power selectively to the second area of the volatile storage based at least in part on a loss of a primary power for the persistent memory device.

Statement 60. An embodiment of the disclosure includes the article according to statement 59, wherein receiving the load request at the persistent memory device includes receiving the load request at a cache coherent interconnect interface of the persistent memory device.

Statement 61. An embodiment of the disclosure includes the article according to statement 60, wherein receiving the load request at the cache coherent interconnect interface of the persistent memory device includes receiving the load request at a Compute Express Link (CXL) interface of the persistent memory device.

Statement 62. An embodiment of the disclosure includes the article according to statement 59, wherein the backup power source is configured to not provide backup power to the first area of the volatile storage.

Statement 63. An embodiment of the disclosure includes the article according to statement 59, wherein:

locating the data at the address in at least one of the first area of the volatile storage of the persistent memory and the second area of the volatile storage of the persistent memory device includes locating the data at the address in at least one of the first area of a Dynamic Random Access Memory (DRAM) of the persistent memory and the second area of the DRAM of the persistent memory device; and the non-volatile storage includes a Solid State Drive (SSD).

Statement 64. An embodiment of the disclosure includes the article according to statement 59, wherein locating the data at the address in at least one of the first area of the volatile storage of the persistent memory and the second area of the volatile storage of the persistent memory device includes:

loading the data into the address in the first area of the volatile storage of the persistent memory device from the non-volatile storage of the persistent memory device; and locating the data at the address in the first area of the volatile storage of the persistent memory device.

Statement 65. An embodiment of the disclosure includes the article according to statement 64, wherein loading the data into the address in the first area of the volatile storage of the persistent memory device from the non-volatile storage of the persistent memory device includes allocating the address in the first area of the volatile storage of the persistent memory device.

Statement 66. An embodiment of the disclosure includes the article according to statement 64, wherein loading the data into the address in the first area of the volatile storage of the persistent memory device from the non-volatile storage of the persistent memory device includes deleting a second data from the address in the first area of the volatile storage of the persistent memory device.

Statement 67. An embodiment of the disclosure includes the article according to statement 59, wherein locating the data at the address in at least one of the first area of a volatile storage of the persistent memory and the second area of the volatile storage of the persistent memory device includes:

loading the data into the address in the second area of the volatile storage of the persistent memory device from the non-volatile storage of the persistent memory device based at least in part on the first area of the volatile storage of the persistent memory device being full and the address in the second area of the volatile storage of the persistent memory device being free; and locating the data at the address in the second area of the volatile storage of the persistent memory device.

Statement 68. An embodiment of the disclosure includes the article according to statement 67, wherein loading the data into the address in the second area of the volatile storage of the persistent memory device from the non-volatile storage of the persistent memory device includes allocating the address in the second area of the volatile storage of the persistent memory device.

Statement 69. An embodiment of the disclosure includes an article, comprising a non-transitory storage medium, the non-transitory storage medium having stored thereon instructions that, when executed by a machine, result in:

receiving a store request at a persistent memory device, the store request including a change data;

locating an original data at an address in a first area of a volatile storage of the persistent memory device; and updating the original data at the address in the first area of the volatile storage of the persistent memory device with the change data to produce an updated data, wherein the persistent memory device includes a non-volatile storage, wherein the first area of the volatile storage of the persistent memory device is backed by a backup power source configured to provide backup power selectively to the first area of the volatile storage based at least in part on a loss of a primary power for the persistent memory device, and wherein the volatile storage of the persistent memory device includes a first area.

Statement 70. An embodiment of the disclosure includes the article according to statement 69, wherein receiving the store request at the persistent memory device includes receiving the store request at a cache coherent interconnect interface of the persistent memory device.

Statement 71. An embodiment of the disclosure includes the article according to statement 70, wherein receiving the store request at the cache coherent interconnect interface of the persistent memory device includes receiving the store request at a Compute Express Link (CXL) interface of the persistent memory device.

Statement 72. An embodiment of the disclosure includes the article according to statement 69, wherein the backup power source is configured to not provide backup power to the first area of the volatile storage.

Statement 73. An embodiment of the disclosure includes the article according to statement 69, wherein:

locating the original data at the address in the first area of the volatile storage of the persistent memory device includes locating the original data at the address in the first area of a Dynamic Random Access Memory (DRAM) of the persistent memory device;

updating the original data at the address in the first area of the volatile storage of the persistent memory device with the change data to produce the updated data includes updating the original data at the address in the first area of the DRAM of the persistent memory device with the change data to produce the updated data; and the non-volatile storage includes a Solid State Drive (SSD).

Statement 74. An embodiment of the disclosure includes the article according to statement 69, wherein locating the original data at the address in the first area of the volatile storage of the persistent memory device includes loading the original data into the address in the first area of the volatile storage of the persistent memory device.

Statement 75. An embodiment of the disclosure includes the article according to statement 74, wherein loading the original data into the address in the first area of the volatile storage of the persistent memory device includes allocating the address in the first area of the volatile storage of the persistent memory device.

Statement 76. An embodiment of the disclosure includes the article according to statement 74, wherein loading the original data into the address in the first area of the volatile storage of the persistent memory device includes evicting a first data at the address in the first area of the volatile storage of the persistent memory device.

Statement 77. An embodiment of the disclosure includes the article according to statement 76, wherein evicting the first data at the address in the first area of the volatile storage of the persistent memory device includes writing the first data to the non-volatile storage of the persistent memory device.

Statement 78. An embodiment of the disclosure includes the article according to statement 77, wherein evicting the first data at the address in the first area of the volatile storage of the persistent memory device further includes deleting the first data at the address in the first area of the volatile storage of the persistent memory device.

Statement 79. An embodiment of the disclosure includes the article according to statement 77, wherein evicting the first data at the address in the first area of the volatile storage of the persistent memory device further includes copying the first data at the address in the first area of the volatile storage of the persistent memory device into a first address in the second area of the volatile storage of the persistent memory device.

Statement 80. An embodiment of the disclosure includes the article according to statement 79, wherein copying the first data at the address in the first area of the volatile storage of the persistent memory device into the first address in the second area of the volatile storage of the persistent memory device includes allocating the first address in the second area of the volatile storage of the persistent memory device.

Statement 81. An embodiment of the disclosure includes the article according to statement 79, wherein copying the first data at the address in the first area of the volatile storage of the persistent memory device into the first address in the second area of the volatile storage of the persistent memory device includes deleting a third data at the first address in the second area of the volatile storage of the persistent memory device.

Statement 82. An embodiment of the disclosure includes the article according to statement 74, wherein loading the original data into the address in the first area of the volatile storage of the persistent memory device includes copying the original data into the address in the first area of the volatile storage of the persistent memory device from at least one of a first address in the second area of the volatile storage of the persistent memory device or the non-volatile storage of the persistent memory device.

Statement 83. An embodiment of the disclosure includes the article according to statement 82, wherein copying the original data into the address in the first area of the volatile storage of the persistent memory device from at least one of a first address in the second area of the volatile storage of the persistent memory device or the non-volatile storage of the persistent memory device includes:

copying the original data into the address in the first area of the volatile storage of the persistent memory device from the second area of the volatile storage of the persistent memory device; and deleting the original data from the second area of the volatile storage of the persistent memory device.

Statement 84. An embodiment of the disclosure includes the article according to statement 82, wherein copying the original data into the address in the first area of the volatile storage of the persistent memory device from at least one of a first address in the second area of the volatile storage of the persistent memory device or the non-volatile storage of the persistent memory device includes copying the original data into the address in the first area of the volatile storage of the persistent memory device from the non-volatile storage of the persistent memory device.

Statement 85. An embodiment of the disclosure includes the article according to statement 74, the non-transitory storage medium having stored thereon further instructions that, when executed by the machine, result in copying the updated data from the first area of the volatile storage of the persistent memory device into the non-volatile storage of the persistent memory device.

Statement 86. An embodiment of the disclosure includes the article according to statement 85, wherein copying the updated data from the first area of the volatile storage of the persistent memory device into the non-volatile storage of the persistent memory device includes copying the updated data from the first area of the volatile storage of the persistent memory device into the non-volatile storage of the persistent memory device based at least in part on opportunistic write availability.

Statement 87. An embodiment of the disclosure includes the article according to statement 85, wherein copying the updated data from the first area of the volatile storage of the persistent memory device into the non-volatile storage of the persistent memory device includes copying the updated data from the first area of the volatile storage of the persistent memory device into the non-volatile storage of the persistent memory device based at least in part on a checkpoint being triggered.

Statement 88. An embodiment of the disclosure includes an article, comprising a non-transitory storage medium, the non-transitory storage medium having stored thereon instructions that, when executed by a machine, result in:

determining that a loss of a primary power for the persistent memory device has occurred; and copying at least a first data from a first area of a volatile storage of the persistent memory device and a first data from a second area of the volatile storage of the persistent memory device into a non-volatile storage of the persistent memory device.

Statement 89. An embodiment of the disclosure includes the article according to statement 88, wherein copying at least the first data from the first area of the volatile storage of the persistent memory device and the first data from the second area of the volatile storage of the persistent memory device into the non-volatile storage of the persistent memory device includes copying at least the first data from the first area of the volatile storage of the persistent memory device and the first data from the second area of the volatile storage of the persistent memory device into the non-volatile storage of the persistent memory device using a backup power source of the persistent memory device.

Statement 90. An embodiment of the disclosure includes the article according to statement 88, wherein copying at least the first data from the first area of the volatile storage of the persistent memory device and the first data from the second area of the volatile storage of the persistent memory device into the non-volatile storage of the persistent memory device includes copying at least the first data from the first area of a Dynamic Random Access Memory (DRAM) of the persistent memory device and the first data from the second area of the DRAM of the persistent memory device into a Solid State Drive (SSD) of the persistent memory device.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A memory device, comprising:
an interface;
a volatile storage including at least a first area and a second area;
a power source configured to selectively provide power to the second area of the volatile storage;
a non-volatile storage; and
a controller to control the volatile storage and the non-volatile storage,
wherein the memory device is configured to transfer a data from the second area of the volatile storage to the non-volatile storage.

2. The memory device according to claim 1, wherein:
the first area is configured to store a first data of a first type; and
the second area is configured to store a second data of a second type.

3. The memory device according to claim 2, wherein:
the volatile storage further includes a third area configured to store a third data of a third type; and
the power source is configured to provide power to the second area of the volatile storage and the third area of the volatile storage.

4. The memory device according to claim 3, wherein the memory device is configured to transfer at least one of a first data from the second area of the volatile storage or a second data from the third area of the volatile storage to the non-volatile storage.

5. The memory device according to claim 1, wherein the interface is configured to receive a load request for a second data and to return the second data from at least one of the first area or the second area.

6. The memory device according to claim 1, wherein:
the interface is configured to receive a store request for a second data, the second data including a first size; and
the controller is configured to update a third data in an address in the second area to produce a fourth data based at least in part on the second data and the third data.

7. The memory device according to claim 1, wherein a first size of the first area and a second size of the second area are configurable by a user.

8. The memory device according to claim 1, wherein the interface supports a first protocol and a second protocol.

9. A method, comprising:
receiving a load request at a memory device, the load request requesting a data;
locating the data at an address in at least one of a first area of a volatile storage of the memory or a second area of the volatile storage of the memory device; and
returning the data at the address from the memory device,
wherein the memory device includes a non-volatile storage, and
wherein the second area of the volatile storage of the memory device is selectively backed by a power source.

10. The method according to claim 9, wherein locating the data at the address in at least one of the first area of the volatile storage of the memory and the second area of the volatile storage of the memory device includes:
loading the data into the address in the first area of the volatile storage of the memory device from the non-volatile storage of the memory device; and
locating the data at the address in the first area of the volatile storage of the memory device.

11. The method according to claim 10, wherein loading the data into the address in the first area of the volatile storage of the memory device from the non-volatile storage of the memory device includes allocating the address in the first area of the volatile storage of the memory device.

12. The method according to claim 10, wherein loading the data into the address in the first area of the volatile storage of the memory device from the non-volatile storage of the memory device includes deleting a second data from the address in the first area of the volatile storage of the memory device.

13. The method according to claim 9, wherein the memory device supports a first protocol and a second protocol.

14. A method, comprising:
receiving a store request at a memory device, the store request including a first data;
locating a second data at an address in a first area of a volatile storage of the memory device; and
updating the second data at the address in the first area of the volatile storage of the memory device with the first data to produce a third data,
wherein the memory device includes a non-volatile storage,
wherein the first area of the volatile storage of the memory device is selectively backed by a power source configured to provide power to the first area of the volatile storage, and
wherein the volatile storage of the memory device includes a second area.

15. The method according to claim 14, wherein locating the second data at the address in the first area of the volatile storage of the memory device includes loading the second data into the address in the first area of the volatile storage of the memory device.

16. The method according to claim 15, wherein loading the second data into the address in the first area of the volatile storage of the memory device includes allocating the address in the first area of the volatile storage of the memory device.

17. The method according to claim 15, wherein loading the second data into the address in the first area of the volatile storage of the memory device includes evicting a fourth data at the address in the first area of the volatile storage of the memory device.

18. The method according to claim 17, wherein evicting the fourth data at the address in the first area of the volatile storage of the memory device includes writing the fourth data to the non-volatile storage of the memory device.

19. The method according to claim 15, further comprising copying the third data from the first area of the volatile storage of the memory device into the non-volatile storage of the memory device.

20. The method according to claim 14, wherein the memory device supports a first protocol and a second protocol.

\* \* \* \* \*